United States Patent
Duke et al.

(10) Patent No.: US 10,412,198 B1
(45) Date of Patent: Sep. 10, 2019

(54) METHODS FOR IMPROVED TRANSMISSION CONTROL PROTOCOL (TCP) PERFORMANCE VISIBILITY AND DEVICES THEREOF

(71) Applicant: F5 Networks, Inc., Seattle, WA (US)

(72) Inventors: Martin Duke, Seattle, WA (US); Saxon Amdahl, Portola Valley, CA (US)

(73) Assignee: F5 Networks, Inc., Seattle, WA (US)

( * ) Notice: Subject to any disclaimer, the term of this patent is extended or adjusted under 35 U.S.C. 154(b) by 15 days.

(21) Appl. No.: 15/721,184

(22) Filed: Sep. 29, 2017

Related U.S. Application Data

(60) Provisional application No. 62/413,488, filed on Oct. 27, 2016.

(51) Int. Cl.
| | | |
|---|---|---|
| *H04L 1/00* | (2006.01) | |
| *H04L 29/06* | (2006.01) | |
| *H04L 12/801* | (2013.01) | |

(52) U.S. Cl.
CPC ............ *H04L 69/02* (2013.01); *H04L 47/193* (2013.01)

(58) Field of Classification Search
CPC .............................. H04L 69/02; H04L 47/193
See application file for complete search history.

(56) References Cited

U.S. PATENT DOCUMENTS

| | | | |
|---|---|---|---|
| 4,993,030 A | 2/1991 | Krakauer et al. | |
| 5,218,695 A | 6/1993 | Noveck et al. | |
| 5,282,201 A | 1/1994 | Frank et al. | |
| 5,303,368 A | 4/1994 | Kotaki | |
| 5,473,362 A | 12/1995 | Fitzgerald et al. | |
| 5,511,177 A | 4/1996 | Kagimasa et al. | |
| 5,537,585 A | 7/1996 | Blickenstaff et al. | |

(Continued)

FOREIGN PATENT DOCUMENTS

| | | |
|---|---|---|
| AU | 2003300350 A1 | 7/2004 |
| CA | 2080530 A1 | 4/1994 |

(Continued)

OTHER PUBLICATIONS

"A Storage Architecture Guide," Second Edition, 2001, Auspex Systems, Inc., www.auspex.com, last accessed on Dec. 30, 2002.

(Continued)

*Primary Examiner* — Phuc H Tran
(74) *Attorney, Agent, or Firm* — Pepper Hamilton LLP

(57) ABSTRACT

Methods, non-transitory computer readable media, network traffic management apparatuses, and network traffic management systems that generate a duration corresponding to a current one of a plurality of states in a TCP connection. The duration is generated based on a difference between a stored time recorded at a previous transition to the current one of the states and a current time. The duration is stored or output as associated with the current one of the states. The stored time recorded at the previous transition to the current one of the states is then replaced with the current time. A determination is made when one or more TCP configurations should be modified based on the duration for the current one of the states. The one or more TCP configurations are automatically modified to improve TCP performance, when the determining indicates that the one or more TCP configurations should be modified.

20 Claims, 4 Drawing Sheets

(56) References Cited

U.S. PATENT DOCUMENTS

| | | |
|---|---|---|
| 5,548,724 A | 8/1996 | Akizawa et al. |
| 5,550,816 A | 8/1996 | Hardwick et al. |
| 5,550,965 A | 8/1996 | Gabbe et al. |
| 5,583,995 A | 12/1996 | Gardner et al. |
| 5,586,260 A | 12/1996 | Hu |
| 5,590,320 A | 12/1996 | Maxey |
| 5,606,665 A | 2/1997 | Yang et al. |
| 5,623,490 A | 4/1997 | Richter et al. |
| 5,649,194 A | 7/1997 | Miller et al. |
| 5,649,200 A | 7/1997 | Leblang et al. |
| 5,668,943 A | 9/1997 | Attanasio et al. |
| 5,692,180 A | 11/1997 | Lee |
| 5,721,779 A | 2/1998 | Funk |
| 5,724,512 A | 3/1998 | Winterbottom |
| 5,806,061 A | 9/1998 | Chaudhuri et al. |
| 5,832,496 A | 11/1998 | Anand et al. |
| 5,832,522 A | 11/1998 | Blickenstaff et al. |
| 5,838,970 A | 11/1998 | Thomas |
| 5,862,325 A | 1/1999 | Reed et al. |
| 5,884,303 A | 3/1999 | Brown |
| 5,893,086 A | 4/1999 | Schmuck et al. |
| 5,897,638 A | 4/1999 | Lasser et al. |
| 5,905,990 A | 5/1999 | Inglett |
| 5,917,998 A | 6/1999 | Cabrera et al. |
| 5,920,873 A | 7/1999 | Van Huben et al. |
| 5,926,816 A | 7/1999 | Bauer et al. |
| 5,937,406 A | 8/1999 | Balabine et al. |
| 5,991,302 A | 11/1999 | Berl et al. |
| 5,995,491 A | 11/1999 | Richter et al. |
| 5,999,664 A | 12/1999 | Mahoney et al. |
| 6,012,083 A | 1/2000 | Savitzky et al. |
| 6,026,500 A | 2/2000 | Topff et al. |
| 6,029,168 A | 2/2000 | Frey |
| 6,029,175 A | 2/2000 | Chow et al. |
| 6,041,365 A | 3/2000 | Kleinerman |
| 6,044,367 A | 3/2000 | Wolff |
| 6,047,129 A | 4/2000 | Frye |
| 6,047,356 A | 4/2000 | Anderson et al. |
| 6,067,558 A | 5/2000 | Wendt et al. |
| 6,072,942 A | 6/2000 | Stockwell et al. |
| 6,078,929 A | 6/2000 | Rao |
| 6,085,234 A | 7/2000 | Pitts et al. |
| 6,088,694 A | 7/2000 | Burns et al. |
| 6,104,706 A | 8/2000 | Richter et al. |
| 6,128,627 A | 10/2000 | Mattis et al. |
| 6,128,717 A | 10/2000 | Harrison et al. |
| 6,154,777 A | 11/2000 | Ebrahim |
| 6,157,950 A | 12/2000 | Krishnan |
| 6,161,145 A | 12/2000 | Bainbridge et al. |
| 6,161,185 A | 12/2000 | Guthrie et al. |
| 6,181,336 B1 | 1/2001 | Chiu et al. |
| 6,202,156 B1 | 3/2001 | Kalajan |
| 6,223,206 B1 | 4/2001 | Dan et al. |
| 6,233,648 B1 | 5/2001 | Tomita |
| 6,237,008 B1 | 5/2001 | Beal et al. |
| 6,256,031 B1 | 7/2001 | Meijer et al. |
| 6,259,405 B1 | 7/2001 | Stewart et al. |
| 6,260,070 B1 | 7/2001 | Shah |
| 6,282,610 B1 | 8/2001 | Bergsten |
| 6,289,345 B1 | 9/2001 | Yasue |
| 6,292,832 B1 | 9/2001 | Shah et al. |
| 6,304,913 B1 | 10/2001 | Rune |
| 6,308,162 B1 | 10/2001 | Ouimet et al. |
| 6,324,581 B1 | 11/2001 | Xu et al. |
| 6,329,985 B1 | 12/2001 | Tamer et al. |
| 6,330,226 B1 * | 12/2001 | Chapman ............. H04L 29/06 370/232 |
| 6,330,574 B1 | 12/2001 | Murashita |
| 6,338,082 B1 | 1/2002 | Schneider |
| 6,339,785 B1 | 1/2002 | Feigenbaum |
| 6,349,343 B1 | 2/2002 | Foody et al. |
| 6,353,848 B1 | 3/2002 | Morris |
| 6,363,056 B1 | 3/2002 | Beigi et al. |
| 6,370,527 B1 | 4/2002 | Singhal |
| 6,370,543 B2 | 4/2002 | Hoffert et al. |
| 6,374,263 B1 | 4/2002 | Bunger et al. |
| 6,389,433 B1 | 5/2002 | Bolosky et al. |
| 6,389,462 B1 | 5/2002 | Cohen et al. |
| 6,393,581 B1 | 5/2002 | Friedman et al. |
| 6,397,246 B1 | 5/2002 | Wolfe |
| 6,412,004 B1 | 6/2002 | Chen et al. |
| 6,438,595 B1 | 8/2002 | Blumenau et al. |
| 6,446,108 B1 | 9/2002 | Rosenberg et al. |
| 6,466,580 B1 | 10/2002 | Leung |
| 6,469,983 B2 | 10/2002 | Narayana et al. |
| 6,477,544 B1 | 11/2002 | Bolosky et al. |
| 6,487,561 B1 | 11/2002 | Ofek et al. |
| 6,493,804 B1 | 12/2002 | Soltis et al. |
| 6,513,061 B1 | 1/2003 | Ebata et al. |
| 6,514,085 B2 | 2/2003 | Slattery et al. |
| 6,516,350 B1 | 2/2003 | Lumelsky et al. |
| 6,516,351 B2 | 2/2003 | Borr |
| 6,542,909 B1 | 4/2003 | Tamer et al. |
| 6,542,936 B1 | 4/2003 | Mayle et al. |
| 6,549,916 B1 | 4/2003 | Sedlar |
| 6,553,352 B2 | 4/2003 | Delurgio et al. |
| 6,556,997 B1 | 4/2003 | Levy |
| 6,556,998 B1 | 4/2003 | Mukherjee et al. |
| 6,560,230 B1 | 5/2003 | Li et al. |
| 6,578,069 B1 | 6/2003 | Hopmann et al. |
| 6,601,101 B1 | 7/2003 | Lee et al. |
| 6,606,663 B1 | 8/2003 | Liao et al. |
| 6,612,490 B1 | 9/2003 | Herrendoerfer et al. |
| 6,615,267 B1 | 9/2003 | Whalen et al. |
| 6,654,346 B1 | 11/2003 | Mahalingaiah et al. |
| 6,701,415 B1 | 3/2004 | Hendren, III |
| 6,708,220 B1 | 3/2004 | Olin |
| 6,721,794 B2 | 4/2004 | Taylor et al. |
| 6,728,265 B1 | 4/2004 | Yavatkar et al. |
| 6,728,704 B2 | 4/2004 | Mao et al. |
| 6,738,357 B1 | 5/2004 | Richter et al. |
| 6,738,790 B1 | 5/2004 | Klein et al. |
| 6,742,035 B1 | 5/2004 | Zayas et al. |
| 6,744,776 B1 | 6/2004 | Kalkunte et al. |
| 6,748,420 B1 | 6/2004 | Quatrano et al. |
| 6,754,215 B1 | 6/2004 | Arikawa et al. |
| 6,754,699 B2 | 6/2004 | Swildens et al. |
| 6,757,706 B1 | 6/2004 | Dong et al. |
| 6,760,337 B1 | 7/2004 | Snyder, II et al. |
| 6,775,672 B2 | 8/2004 | Mahalingam et al. |
| 6,775,673 B2 | 8/2004 | Mahalingam et al. |
| 6,775,679 B2 | 8/2004 | Gupta |
| 6,782,450 B2 | 8/2004 | Arnott et al. |
| 6,795,860 B1 | 9/2004 | Shah |
| 6,801,960 B1 | 10/2004 | Ericson et al. |
| 6,826,613 B1 | 11/2004 | Wang et al. |
| 6,839,761 B2 | 1/2005 | Kadyk et al. |
| 6,847,959 B1 | 1/2005 | Arrouye et al. |
| 6,847,970 B2 | 1/2005 | Keller et al. |
| 6,850,997 B1 | 2/2005 | Rooney et al. |
| 6,865,593 B1 | 3/2005 | Reshef et al. |
| 6,868,447 B1 | 3/2005 | Slaughter et al. |
| 6,871,221 B1 | 3/2005 | Styles |
| 6,871,245 B2 | 3/2005 | Bradley |
| 6,880,017 B1 | 4/2005 | Marce et al. |
| 6,883,137 B1 | 4/2005 | Girardot et al. |
| 6,889,249 B2 | 5/2005 | Miloushev et al. |
| 6,914,881 B1 | 7/2005 | Mansfield et al. |
| 6,922,688 B1 | 7/2005 | Frey, Jr. |
| 6,928,518 B2 | 8/2005 | Talagala |
| 6,934,706 B1 | 8/2005 | Mancuso et al. |
| 6,938,039 B1 | 8/2005 | Bober et al. |
| 6,938,059 B2 | 8/2005 | Tamer et al. |
| 6,959,373 B2 | 10/2005 | Testardi |
| 6,961,815 B2 | 11/2005 | Kistler et al. |
| 6,970,475 B1 | 11/2005 | Fraser et al. |
| 6,970,924 B1 | 11/2005 | Chu et al. |
| 6,973,455 B1 | 12/2005 | Vahalia et al. |
| 6,973,490 B1 | 12/2005 | Robertson et al. |
| 6,973,549 B1 | 12/2005 | Testardi |
| 6,975,592 B1 | 12/2005 | Sedddigh et al. |
| 6,985,936 B2 | 1/2006 | Agarwalla et al. |
| 6,985,956 B2 | 1/2006 | Luke et al. |
| 6,986,015 B2 | 1/2006 | Testardi |

(56) References Cited

U.S. PATENT DOCUMENTS

| | | |
|---|---|---|
| 6,990,074 B2 | 1/2006 | Wan et al. |
| 6,990,114 B1 | 1/2006 | Erimli et al. |
| 6,990,547 B2 | 1/2006 | Ulrich et al. |
| 6,990,667 B2 | 1/2006 | Ulrich et al. |
| 6,996,841 B2 | 2/2006 | Kadyk et al. |
| 6,999,912 B2 | 2/2006 | Loisey et al. |
| 7,003,533 B2 | 2/2006 | Noguchi et al. |
| 7,003,564 B2 | 2/2006 | Greuel et al. |
| 7,006,981 B2 | 2/2006 | Rose et al. |
| 7,039,061 B2 | 2/2006 | Connor et al. |
| 7,010,553 B2 | 3/2006 | Chen et al. |
| 7,013,379 B1 | 3/2006 | Testardi |
| 7,020,644 B2 | 3/2006 | Jameson |
| 7,020,669 B2 | 3/2006 | McCann et al. |
| 7,023,974 B1 | 4/2006 | Brannam et al. |
| 7,024,427 B2 | 4/2006 | Bobbitt et al. |
| 7,035,212 B1 | 4/2006 | Mittal et al. |
| 7,051,112 B2 | 5/2006 | Dawson |
| 7,054,998 B2 | 5/2006 | Arnott et al. |
| 7,055,010 B2 | 5/2006 | Lin et al. |
| 7,065,482 B2 | 6/2006 | Shorey et al. |
| 7,072,917 B2 | 7/2006 | Wong et al. |
| 7,075,924 B2 | 7/2006 | Richter et al. |
| 7,076,689 B2 | 7/2006 | Atkinson |
| 7,080,314 B1 | 7/2006 | Garofalakis et al. |
| 7,089,286 B1 | 8/2006 | Malik |
| 7,089,491 B2 | 8/2006 | Feinberg et al. |
| 7,111,115 B2 | 9/2006 | Peters et al. |
| 7,113,962 B1 | 9/2006 | Kee et al. |
| 7,113,996 B2 | 9/2006 | Kronenberg |
| 7,120,728 B2 | 10/2006 | Krakirian et al. |
| 7,120,746 B2 | 10/2006 | Campbell et al. |
| 7,127,556 B2 | 10/2006 | Blumenau et al. |
| 7,133,863 B2 | 11/2006 | Teng et al. |
| 7,133,967 B2 | 11/2006 | Fujie et al. |
| 7,143,146 B2 | 11/2006 | Nakatani et al. |
| 7,146,524 B2 | 12/2006 | Patel et al. |
| 7,152,184 B2 | 12/2006 | Maeda et al. |
| 7,155,466 B2 | 12/2006 | Rodriguez et al. |
| 7,165,095 B2 | 1/2007 | Sim |
| 7,167,821 B2 | 1/2007 | Hardwick et al. |
| 7,171,469 B2 | 1/2007 | Ackaouy et al. |
| 7,173,929 B1 | 2/2007 | Testardi |
| 7,181,523 B2 | 2/2007 | Sim |
| 7,191,163 B2 | 3/2007 | Herrera et al. |
| 7,194,579 B2 | 3/2007 | Robinson et al. |
| 7,228,359 B1 | 6/2007 | Monteiro |
| 7,234,074 B2 | 6/2007 | Cohn et al. |
| 7,236,491 B2 | 6/2007 | Tsao et al. |
| 7,240,100 B1 | 7/2007 | Wein et al. |
| 7,243,089 B2 | 7/2007 | Becker-Szendy et al. |
| 7,243,094 B2 | 7/2007 | Tabellion et al. |
| 7,263,610 B2 | 8/2007 | Parker et al. |
| 7,269,168 B2 | 9/2007 | Roy et al. |
| 7,269,582 B2 | 9/2007 | Winter et al. |
| 7,272,613 B2 | 9/2007 | Sim et al. |
| 7,280,536 B2 | 10/2007 | Testardi |
| 7,284,150 B2 | 10/2007 | Ma et al. |
| 7,292,541 B1 | 11/2007 | C S |
| 7,293,097 B2 | 11/2007 | Borr |
| 7,293,099 B1 | 11/2007 | Kalajan |
| 7,293,133 B1 | 11/2007 | Colgrove et al. |
| 7,296,263 B1 | 11/2007 | Jacob |
| 7,299,250 B2 | 11/2007 | Douceur et al. |
| 7,308,475 B1 | 12/2007 | Pruitt et al. |
| 7,324,533 B1 | 1/2008 | DeLiberato et al. |
| 7,330,486 B2 | 2/2008 | Ko et al. |
| 7,340,571 B2 | 3/2008 | Saze |
| 7,343,398 B1 | 3/2008 | Lownsbrough |
| 7,346,664 B2 | 3/2008 | Wong et al. |
| 7,373,438 B1 | 5/2008 | DeBergalis et al. |
| 7,383,288 B2 | 6/2008 | Miloushev et al. |
| 7,401,220 B2 | 7/2008 | Bolosky et al. |
| 7,406,484 B1 | 7/2008 | Srinivasan et al. |
| 7,409,440 B1 | 8/2008 | Jacob |
| 7,415,488 B1 | 8/2008 | Muth et al. |
| 7,415,608 B2 | 8/2008 | Bolosky et al. |
| 7,418,439 B2 | 8/2008 | Wong |
| 7,437,358 B2 | 10/2008 | Arrouye et al. |
| 7,440,982 B2 | 10/2008 | Lu et al. |
| 7,457,982 B2 | 11/2008 | Rajan |
| 7,467,158 B2 | 12/2008 | Marinescu |
| 7,475,241 B2 | 1/2009 | Patel et al. |
| 7,477,796 B2 | 1/2009 | Sasaki et al. |
| 7,509,322 B2 | 3/2009 | Miloushev et al. |
| 7,512,673 B2 | 3/2009 | Miloushev et al. |
| 7,519,813 B1 | 4/2009 | Cox et al. |
| 7,532,577 B2 * | 5/2009 | Park .................. H04L 47/10 370/241 |
| 7,562,110 B2 | 7/2009 | Miloushev et al. |
| 7,571,168 B2 | 8/2009 | Bahar et al. |
| 7,574,433 B2 | 8/2009 | Engel |
| 7,577,723 B2 | 8/2009 | Matsuda et al. |
| 7,587,471 B2 | 9/2009 | Yasuda et al. |
| 7,590,747 B2 | 9/2009 | Coates et al. |
| 7,599,941 B2 | 10/2009 | Bahar et al. |
| 7,610,307 B2 | 10/2009 | Havewala et al. |
| 7,610,390 B2 | 10/2009 | Yared et al. |
| 7,624,109 B2 | 11/2009 | Testardi |
| 7,639,883 B2 | 12/2009 | Gill |
| 7,640,347 B1 | 12/2009 | Sloat et al. |
| 7,644,109 B2 | 1/2010 | Manley et al. |
| 7,653,699 B1 | 1/2010 | Colgrove et al. |
| 7,656,788 B2 | 2/2010 | Ma et al. |
| 7,684,423 B2 | 3/2010 | Tripathi et al. |
| 7,685,177 B1 | 3/2010 | Hagerstrom et al. |
| 7,689,596 B2 | 3/2010 | Tsunoda |
| 7,694,082 B2 | 4/2010 | Golding et al. |
| 7,698,458 B1 | 4/2010 | Lui et al. |
| 7,711,771 B2 | 5/2010 | Kirnos |
| 7,734,603 B1 | 6/2010 | McManis |
| 7,739,540 B2 | 6/2010 | Akutsu et al. |
| 7,743,035 B2 | 6/2010 | Chen et al. |
| 7,752,294 B2 | 7/2010 | Meyer et al. |
| 7,769,711 B2 | 8/2010 | Srinivasan et al. |
| 7,788,335 B2 | 8/2010 | Miloushev et al. |
| 7,809,691 B1 | 10/2010 | Karmarkar et al. |
| 7,822,839 B1 | 10/2010 | Pruitt et al. |
| 7,822,939 B1 | 10/2010 | Veprinsky et al. |
| 7,831,639 B1 | 11/2010 | Panchbudhe et al. |
| 7,849,112 B2 | 12/2010 | Mane et al. |
| 7,853,958 B2 | 12/2010 | Matthew et al. |
| 7,861,085 B1 | 12/2010 | Case et al. |
| 7,870,154 B2 | 1/2011 | Shitomi et al. |
| 7,877,511 B1 | 1/2011 | Berger et al. |
| 7,885,970 B2 | 2/2011 | Lacapra |
| 7,886,218 B2 | 2/2011 | Watson |
| 7,895,653 B2 | 2/2011 | Calo et al. |
| 7,900,002 B2 | 3/2011 | Lyon |
| 7,903,554 B1 | 3/2011 | Manur et al. |
| 7,904,466 B1 | 3/2011 | Valencia et al. |
| 7,908,245 B2 | 3/2011 | Nakano et al. |
| 7,913,053 B1 | 3/2011 | Newland |
| 7,953,085 B2 | 5/2011 | Chang et al. |
| 7,953,701 B2 | 5/2011 | Okitsu et al. |
| 7,958,222 B1 | 6/2011 | Pruitt et al. |
| 7,958,347 B1 | 6/2011 | Ferguson |
| 7,984,500 B1 | 7/2011 | Khanna et al. |
| 8,005,953 B2 | 8/2011 | Miloushev et al. |
| 8,015,157 B2 | 9/2011 | Kamei et al. |
| 8,024,443 B1 | 9/2011 | Jacob |
| 8,046,547 B1 | 10/2011 | Chatterjee et al. |
| 8,055,724 B2 | 11/2011 | Amegadzie et al. |
| 8,064,342 B2 | 11/2011 | Badger |
| 8,069,225 B2 | 11/2011 | McCann et al. |
| 8,099,758 B2 | 1/2012 | Schaefer et al. |
| 8,103,622 B1 | 1/2012 | Karinta |
| 8,112,392 B1 | 2/2012 | Bunnell et al. |
| 8,117,244 B2 | 2/2012 | Marinov et al. |
| 8,155,128 B2 | 4/2012 | Balyan et al. |
| 8,171,124 B2 | 5/2012 | Kondamuru |
| 8,190,769 B1 | 5/2012 | Shukla et al. |
| 8,209,403 B2 | 6/2012 | Szabo et al. |
| 8,271,751 B2 | 9/2012 | Hinrichs, Jr. |

(56) References Cited

U.S. PATENT DOCUMENTS

| | | | |
|---|---|---|---|
| 8,302,100 B2 | 10/2012 | Deng et al. | |
| 8,326,798 B1 | 12/2012 | Driscoll et al. | |
| 8,351,600 B2 | 1/2013 | Resch | |
| 8,396,836 B1 | 3/2013 | Ferguson et al. | |
| 8,463,850 B1 | 6/2013 | McCann | |
| 8,484,348 B2 | 7/2013 | Subramanian et al. | |
| 8,560,693 B1 | 10/2013 | Wang et al. | |
| 8,601,000 B1 | 12/2013 | Stefani et al. | |
| 2001/0003164 A1* | 6/2001 | Murakami | G06F 1/26 700/22 |
| 2001/0007560 A1 | 7/2001 | Masuda et al. | |
| 2001/0047293 A1 | 11/2001 | Waller et al. | |
| 2002/0012352 A1 | 1/2002 | Hansson et al. | |
| 2002/0012382 A1 | 1/2002 | Schilling | |
| 2002/0035537 A1 | 3/2002 | Waller et al. | |
| 2002/0038360 A1 | 3/2002 | Andrews et al. | |
| 2002/0059263 A1 | 5/2002 | Shima et al. | |
| 2002/0065848 A1 | 5/2002 | Walker et al. | |
| 2002/0072048 A1 | 6/2002 | Slattery et al. | |
| 2002/0087571 A1 | 7/2002 | Stapel et al. | |
| 2002/0087744 A1 | 7/2002 | Kitchin | |
| 2002/0087887 A1 | 7/2002 | Busam et al. | |
| 2002/0099829 A1 | 7/2002 | Richards et al. | |
| 2002/0099842 A1 | 7/2002 | Jennings et al. | |
| 2002/0103823 A1 | 8/2002 | Jackson et al. | |
| 2002/0106263 A1 | 8/2002 | Winker | |
| 2002/0120727 A1* | 8/2002 | Curley | H04L 41/12 709/223 |
| 2002/0120763 A1 | 8/2002 | Miloushev et al. | |
| 2002/0143819 A1 | 10/2002 | Han et al. | |
| 2002/0143852 A1 | 10/2002 | Guo et al. | |
| 2002/0150253 A1 | 10/2002 | Brezak et al. | |
| 2002/0156905 A1 | 10/2002 | Weissman | |
| 2002/0161911 A1 | 10/2002 | Pinckney, III et al. | |
| 2002/0162118 A1 | 10/2002 | Levy et al. | |
| 2002/0174216 A1 | 11/2002 | Shorey et al. | |
| 2002/0194112 A1 | 12/2002 | dePinto et al. | |
| 2002/0194342 A1 | 12/2002 | Lu et al. | |
| 2002/0198956 A1 | 12/2002 | Dunshea et al. | |
| 2003/0005172 A1 | 1/2003 | Chessell | |
| 2003/0009528 A1 | 1/2003 | Sharif et al. | |
| 2003/0012382 A1 | 1/2003 | Ferchichi et al. | |
| 2003/0018450 A1 | 1/2003 | Carley | |
| 2003/0018585 A1 | 1/2003 | Butler et al. | |
| 2003/0028514 A1 | 2/2003 | Lord et al. | |
| 2003/0033308 A1 | 2/2003 | Patel et al. | |
| 2003/0033535 A1 | 2/2003 | Fisher et al. | |
| 2003/0034905 A1 | 2/2003 | Anton et al. | |
| 2003/0051045 A1 | 3/2003 | Connor | |
| 2003/0055723 A1 | 3/2003 | English | |
| 2003/0065956 A1 | 4/2003 | Belapurkar et al. | |
| 2003/0074301 A1 | 4/2003 | Solomon | |
| 2003/0105846 A1 | 6/2003 | Zhao et al. | |
| 2003/0108000 A1 | 6/2003 | Chaney et al. | |
| 2003/0108002 A1 | 6/2003 | Chaney et al. | |
| 2003/0128708 A1 | 7/2003 | Inoue et al. | |
| 2003/0130945 A1 | 7/2003 | Force et al. | |
| 2003/0139934 A1 | 7/2003 | Mandera | |
| 2003/0156586 A1 | 8/2003 | Lee et al. | |
| 2003/0159072 A1 | 8/2003 | Bellinger et al. | |
| 2003/0171978 A1 | 9/2003 | Jenkins et al. | |
| 2003/0177364 A1 | 9/2003 | Walsh et al. | |
| 2003/0177388 A1 | 9/2003 | Botz et al. | |
| 2003/0179755 A1 | 9/2003 | Fraser | |
| 2003/0189936 A1 | 10/2003 | Terrell et al. | |
| 2003/0191812 A1 | 10/2003 | Agarwalla et al. | |
| 2003/0195813 A1 | 10/2003 | Pallister et al. | |
| 2003/0195962 A1 | 10/2003 | Kikuchi et al. | |
| 2003/0200207 A1 | 10/2003 | Dickinson | |
| 2003/0204635 A1 | 10/2003 | Ko et al. | |
| 2003/0212954 A1 | 11/2003 | Patrudu | |
| 2003/0220835 A1 | 11/2003 | Barnes, Jr. | |
| 2003/0229665 A1 | 12/2003 | Ryman | |
| 2003/0236995 A1 | 12/2003 | Fretwell, Jr. | |
| 2004/0003266 A1 | 1/2004 | Moshir et al. | |
| 2004/0006575 A1 | 1/2004 | Visharam et al. | |
| 2004/0006591 A1 | 1/2004 | Matsui et al. | |
| 2004/0010654 A1 | 1/2004 | Yasuda et al. | |
| 2004/0015783 A1 | 1/2004 | Lennon et al. | |
| 2004/0017825 A1 | 1/2004 | Stanwood et al. | |
| 2004/0028043 A1 | 2/2004 | Maveli et al. | |
| 2004/0030627 A1 | 2/2004 | Sedukhin | |
| 2004/0030740 A1 | 2/2004 | Stelting | |
| 2004/0030857 A1 | 2/2004 | Krakirian et al. | |
| 2004/0043758 A1 | 3/2004 | Sorvari et al. | |
| 2004/0044705 A1 | 3/2004 | Stager et al. | |
| 2004/0054748 A1 | 3/2004 | Ackaouy et al. | |
| 2004/0059789 A1 | 3/2004 | Shum | |
| 2004/0064544 A1 | 4/2004 | Barsness et al. | |
| 2004/0064554 A1 | 4/2004 | Kuno et al. | |
| 2004/0093361 A1 | 5/2004 | Therrien et al. | |
| 2004/0098595 A1 | 5/2004 | Aupperle et al. | |
| 2004/0122926 A1 | 6/2004 | Moore et al. | |
| 2004/0123277 A1 | 6/2004 | Schrader et al. | |
| 2004/0133577 A1 | 7/2004 | Miloushev et al. | |
| 2004/0133605 A1 | 7/2004 | Chang et al. | |
| 2004/0133606 A1 | 7/2004 | Miloushev et al. | |
| 2004/0138858 A1 | 7/2004 | Carley | |
| 2004/0139355 A1 | 7/2004 | Axel et al. | |
| 2004/0148380 A1 | 7/2004 | Meyer et al. | |
| 2004/0153479 A1 | 8/2004 | Mikesell et al. | |
| 2004/0167967 A1 | 8/2004 | Bastian et al. | |
| 2004/0199547 A1 | 10/2004 | Winter et al. | |
| 2004/0213156 A1 | 10/2004 | Smallwood et al. | |
| 2004/0215665 A1 | 10/2004 | Edgar et al. | |
| 2004/0236798 A1 | 11/2004 | Srinivasan et al. | |
| 2004/0236826 A1 | 11/2004 | Harville et al. | |
| 2005/0008017 A1 | 1/2005 | Datta et al. | |
| 2005/0021703 A1 | 1/2005 | Cherry et al. | |
| 2005/0027841 A1 | 2/2005 | Rolfe | |
| 2005/0027862 A1 | 2/2005 | Nguyen et al. | |
| 2005/0044158 A1 | 2/2005 | Malik | |
| 2005/0050107 A1 | 3/2005 | Mane et al. | |
| 2005/0091214 A1 | 4/2005 | Probert et al. | |
| 2005/0108575 A1 | 5/2005 | Yung | |
| 2005/0114701 A1 | 5/2005 | Atkins et al. | |
| 2005/0117589 A1 | 6/2005 | Douady et al. | |
| 2005/0160161 A1 | 7/2005 | Barrett et al. | |
| 2005/0165656 A1 | 7/2005 | Frederick et al. | |
| 2005/0174944 A1 | 8/2005 | Legault et al. | |
| 2005/0175013 A1 | 8/2005 | Le Pennec et al. | |
| 2005/0180419 A1* | 8/2005 | Park | H04L 47/10 370/389 |
| 2005/0187866 A1 | 8/2005 | Lee | |
| 2005/0198234 A1 | 9/2005 | Leib et al. | |
| 2005/0213587 A1 | 9/2005 | Cho et al. | |
| 2005/0234928 A1 | 10/2005 | Shkvarchuk et al. | |
| 2005/0240664 A1 | 10/2005 | Chen et al. | |
| 2005/0246393 A1 | 11/2005 | Coates et al. | |
| 2005/0256806 A1 | 11/2005 | Tien et al. | |
| 2005/0198501 A1 | 12/2005 | Andreev et al. | |
| 2005/0273456 A1 | 12/2005 | Revanuru et al. | |
| 2005/0289111 A1 | 12/2005 | Tribble et al. | |
| 2006/0010502 A1 | 1/2006 | Mimatsu et al. | |
| 2006/0031374 A1 | 2/2006 | Lu et al. | |
| 2006/0031778 A1 | 2/2006 | Goodwin et al. | |
| 2006/0045089 A1 | 3/2006 | Bacher et al. | |
| 2006/0045096 A1 | 3/2006 | Farmer et al. | |
| 2006/0047785 A1 | 3/2006 | Wang et al. | |
| 2006/0074922 A1 | 4/2006 | Nishimura | |
| 2006/0075475 A1 | 4/2006 | Boulos et al. | |
| 2006/0080353 A1 | 4/2006 | Miloushev et al. | |
| 2006/0100752 A1 | 5/2006 | Kim et al. | |
| 2006/0106882 A1 | 5/2006 | Douceur et al. | |
| 2006/0112367 A1 | 5/2006 | Harris | |
| 2006/0123062 A1 | 6/2006 | Bobbitt et al. | |
| 2006/0123210 A1 | 6/2006 | Pritchett et al. | |
| 2006/0130133 A1 | 6/2006 | Andreev et al. | |
| 2006/0140193 A1 | 6/2006 | Kakani et al. | |
| 2006/0153201 A1 | 7/2006 | Hepper et al. | |
| 2006/0167838 A1 | 7/2006 | Lacapra | |
| 2006/0184589 A1 | 8/2006 | Lees et al. | |
| 2006/0198300 A1* | 9/2006 | Li | H04L 47/10 370/229 |

(56) References Cited

U.S. PATENT DOCUMENTS

| | | |
|---|---|---|
| 2006/0200470 A1 | 9/2006 | Lacapra et al. |
| 2006/0224636 A1 | 10/2006 | Kathuria et al. |
| 2006/0224687 A1 | 10/2006 | Popkin et al. |
| 2006/0230265 A1 | 10/2006 | Krishna |
| 2006/0235998 A1 | 10/2006 | Stecher et al. |
| 2006/0259320 A1 | 11/2006 | LaSalle et al. |
| 2006/0268692 A1 | 11/2006 | Wright et al. |
| 2006/0270341 A1 | 11/2006 | Kim et al. |
| 2006/0271598 A1 | 11/2006 | Wong et al. |
| 2006/0277225 A1 | 12/2006 | Mark et al. |
| 2006/0282442 A1 | 12/2006 | Lennon et al. |
| 2006/0282461 A1 | 12/2006 | Marinescu |
| 2006/0282471 A1 | 12/2006 | Mark et al. |
| 2007/0005807 A1 | 1/2007 | Wong |
| 2007/0016613 A1 | 1/2007 | Foresti et al. |
| 2007/0024919 A1 | 2/2007 | Wong et al. |
| 2007/0027929 A1 | 2/2007 | Whelan |
| 2007/0027935 A1 | 2/2007 | Haselton et al. |
| 2007/0028068 A1 | 2/2007 | Golding et al. |
| 2007/0038994 A1 | 2/2007 | Davis et al. |
| 2007/0061441 A1 | 3/2007 | Landis et al. |
| 2007/0088702 A1 | 4/2007 | Fridella et al. |
| 2007/0112775 A1 | 5/2007 | Ackerman |
| 2007/0124415 A1 | 5/2007 | Lev-Ran et al. |
| 2007/0124502 A1 | 5/2007 | Li |
| 2007/0130255 A1 | 6/2007 | Wolovitz et al. |
| 2007/0136308 A1 | 6/2007 | Tsirigotis et al. |
| 2007/0139227 A1 | 6/2007 | Speirs, II et al. |
| 2007/0162891 A1 | 7/2007 | Burner et al. |
| 2007/0168320 A1 | 7/2007 | Borthakur et al. |
| 2007/0180314 A1 | 8/2007 | Kawashima et al. |
| 2007/0208748 A1 | 9/2007 | Li |
| 2007/0209075 A1 | 9/2007 | Coffman |
| 2007/0233826 A1 | 10/2007 | Tindal et al. |
| 2007/0250560 A1 | 10/2007 | Wein et al. |
| 2008/0004022 A1 | 1/2008 | Johannesson et al. |
| 2008/0010372 A1 | 1/2008 | Khedouri et al. |
| 2008/0022059 A1 | 1/2008 | Zimmerer et al. |
| 2008/0046432 A1 | 2/2008 | Anderson et al. |
| 2008/0070575 A1 | 3/2008 | Claussen et al. |
| 2008/0114718 A1 | 5/2008 | Anderson et al. |
| 2008/0189468 A1 | 8/2008 | Schmidt et al. |
| 2008/0208917 A1 | 8/2008 | Smoot et al. |
| 2008/0208933 A1 | 8/2008 | Lyon |
| 2008/0209073 A1 | 8/2008 | Tang |
| 2008/0215836 A1 | 9/2008 | Sutoh et al. |
| 2008/0222223 A1 | 9/2008 | Srinivasan et al. |
| 2008/0243769 A1 | 10/2008 | Arbour et al. |
| 2008/0263401 A1 | 10/2008 | Stenzel |
| 2008/0270578 A1 | 10/2008 | Zhang et al. |
| 2008/0281908 A1 | 11/2008 | McCanne et al. |
| 2008/0282047 A1 | 11/2008 | Arakawa et al. |
| 2008/0294446 A1 | 11/2008 | Guo et al. |
| 2009/0007162 A1 | 1/2009 | Sheehan |
| 2009/0019535 A1 | 1/2009 | Mishra et al. |
| 2009/0037975 A1 | 2/2009 | Ishikawa et al. |
| 2009/0041230 A1 | 2/2009 | Williams |
| 2009/0055507 A1 | 2/2009 | Oeda |
| 2009/0055607 A1 | 2/2009 | Schack et al. |
| 2009/0077097 A1 | 3/2009 | Lacapra et al. |
| 2009/0080440 A1 | 3/2009 | Balyan et al. |
| 2009/0089344 A1 | 4/2009 | Brown et al. |
| 2009/0094252 A1 | 4/2009 | Wong et al. |
| 2009/0094311 A1 | 4/2009 | Awadallah et al. |
| 2009/0106255 A1 | 4/2009 | Lacapra et al. |
| 2009/0106263 A1 | 4/2009 | Khalid et al. |
| 2009/0106413 A1 | 4/2009 | Salo et al. |
| 2009/0125955 A1 | 5/2009 | DeLorme |
| 2009/0132616 A1 | 5/2009 | Winter et al. |
| 2009/0138314 A1 | 5/2009 | Bruce |
| 2009/0161542 A1 | 6/2009 | Ho |
| 2009/0187915 A1 | 7/2009 | Chew et al. |
| 2009/0204649 A1 | 8/2009 | Wong et al. |
| 2009/0204650 A1 | 8/2009 | Wong et al. |
| 2009/0204705 A1 | 8/2009 | Marinov et al. |
| 2009/0210431 A1 | 8/2009 | Marinkovic et al. |
| 2009/0217163 A1 | 8/2009 | Jaroker |
| 2009/0217386 A1 | 8/2009 | Schneider |
| 2009/0240705 A1 | 9/2009 | Miloushev et al. |
| 2009/0240899 A1 | 9/2009 | Akagawa et al. |
| 2009/0241176 A1 | 9/2009 | Beletski et al. |
| 2009/0265396 A1 | 10/2009 | Ram et al. |
| 2009/0265467 A1 | 10/2009 | Peles |
| 2009/0292957 A1 | 11/2009 | Bower et al. |
| 2009/0300161 A1 | 12/2009 | Pruitt et al. |
| 2009/0316708 A1 | 12/2009 | Yahyaoui et al. |
| 2009/0319600 A1 | 12/2009 | Sedan et al. |
| 2010/0017643 A1 | 1/2010 | Baba et al. |
| 2010/0042743 A1 | 2/2010 | Jeon et al. |
| 2010/0061232 A1 | 3/2010 | Zhou et al. |
| 2010/0064001 A1 | 3/2010 | Daily |
| 2010/0070476 A1 | 3/2010 | O'Keefe et al. |
| 2010/0082542 A1 | 4/2010 | Feng et al. |
| 2010/0093318 A1 | 4/2010 | Zhu et al. |
| 2010/0131654 A1 | 5/2010 | Malakapalli et al. |
| 2010/0179984 A1 | 7/2010 | Sebastian |
| 2010/0205206 A1 | 8/2010 | Rabines et al. |
| 2010/0228819 A1 | 9/2010 | Wei |
| 2010/0242092 A1 | 9/2010 | Harris et al. |
| 2010/0250497 A1 | 9/2010 | Redlich et al. |
| 2010/0274772 A1 | 10/2010 | Samuels |
| 2010/0306169 A1 | 12/2010 | Pishevar et al. |
| 2010/0325257 A1 | 12/2010 | Goel et al. |
| 2010/0325634 A1 | 12/2010 | Ichikawa et al. |
| 2011/0055921 A1 | 3/2011 | Narayanaswamy et al. |
| 2011/0066736 A1 | 3/2011 | Mitchell et al. |
| 2011/0072321 A1 | 3/2011 | Dhuse |
| 2011/0083185 A1 | 4/2011 | Sheleheda et al. |
| 2011/0087696 A1 | 4/2011 | Lacapra |
| 2011/0093471 A1 | 4/2011 | Brockway et al. |
| 2011/0107112 A1 | 5/2011 | Resch |
| 2011/0119234 A1 | 5/2011 | Schack et al. |
| 2011/0185082 A1 | 7/2011 | Thompson |
| 2011/0296411 A1 | 12/2011 | Teng et al. |
| 2011/0320882 A1 | 12/2011 | Beaty et al. |
| 2012/0007239 A1 | 3/2012 | Agarwal et al. |
| 2012/0117028 A1 | 5/2012 | Gold et al. |
| 2012/0144229 A1 | 6/2012 | Nadolski |
| 2012/0150699 A1 | 6/2012 | Trapp et al. |
| 2012/0150805 A1 | 6/2012 | Pafumi et al. |
| 2013/0058229 A1 | 3/2013 | Casado et al. |
| 2013/0058252 A1 | 3/2013 | Casado et al. |
| 2013/0058255 A1 | 3/2013 | Casado et al. |

FOREIGN PATENT DOCUMENTS

| | | |
|---|---|---|
| CA | 2512312 A1 | 7/2004 |
| EP | 0605088 A2 | 7/1996 |
| EP | 0 738 970 A1 | 10/1996 |
| EP | 1081918 A2 | 7/2001 |
| JP | 63010250 A | 1/1988 |
| JP | 6205006 A | 7/1994 |
| JP | 06-332782 | 12/1994 |
| JP | 8021924 B | 3/1996 |
| JP | 08-328760 | 12/1996 |
| JP | 08-339355 | 12/1996 |
| JP | 9016510 A | 1/1997 |
| JP | 11282741 A | 10/1999 |
| JP | 2000-183935 A | 6/2000 |
| NZ | 566291 A | 12/2008 |
| WO | WO 0058870 A2 | 10/2000 |
| WO | WO 02/39696 A2 | 5/2002 |
| WO | WO 02/056181 A2 | 7/2002 |
| WO | WO 2004/061605 A2 | 7/2004 |
| WO | WO 2006/091040 A1 | 8/2006 |
| WO | WO 2008/130983 A1 | 10/2008 |
| WO | WO 2008/147973 A2 | 12/2008 |

OTHER PUBLICATIONS

"CSA Persistent File System Technology," A White Paper, Jan. 1, 1999, pp. 1-3, http://www.cosoa.com/white_papers/pfs.php, Colorado Software Architecture, Inc.

(56) References Cited

OTHER PUBLICATIONS

"Distributed File System: A Logical View of Physical Storage: White Paper," 1999, Microsoft Corp., www.microsoft.com, <http://www.eu.microsoft.com/TechNet/prodtechnol/windows2000serv/maintain/DFSnt95>, pp. 1-26, last accessed on Dec. 2, 2002.
"Market Research & Releases, CMPP PoC documentation", last accessed Mar. 29, 2010, (http://mainstreet/sites/PD/Teams/ProdMgmt/MarketResearch/Universal).
"Market Research & Releases, Solstice Diameter Requirements", last accessed Mar. 29, 2010, (http://mainstreet/sites/PD/Teams/ProdMgmt/MarketResearch/Unisversal).
"NERSC Tutorials: I/O on the Cray T3E, 'Chapter 8, Disk Striping'," National Energy Research Scientific Computing Center (NERSC), http://hpcfnersc.gov, last accessed on Dec. 27, 2002, 9 pages.
"Respond to server depending on TCP::client_port", DevCentral Forums iRules, pp. 1-6, last accessed Mar. 26, 2010, (http://devcentral.f5.com/Default/aspx?tabid=53&forumid=5&tpage=1&v).
"Scaling Next Generation Web Infrastructure with Content-Intelligent Switching: White Paper," Apr. 2000, pp. 1-9, Alteon Web Systems, Inc.
"The AFS File System in Distributed Computing Environment," www.transarc.ibm.com/Library/whitepapers/AFS/afsoverview.html, last accessed on Dec. 20, 2002.
"VERITAS SANPoint Foundation Suite(tm) and SANPoint Foundation Suite(tm) HA: New VERITAS Volume Management and File System Technology for Cluster Environments," Sep. 2001, 26 pages, VERITAS Software Corp.
"Windows Clustering Technologies—An Overview," Nov. 2001, 31 pages, Microsoft Corp.
Aguilera et al., "Improving recoverability in multi-tier storage systems," International Conference on Dependable Systems and Networks (DSN—2007), Jun. 2007, 10 pages, Edinburgh, Scotland.
Anderson et al., "Interposed Request Routing for Scalable Network Storage," ACM Transactions on Computer Systems 20(1): (Feb. 2002), pp. 1-24.
Anderson et al., "Serverless Network File System," in the 15th Symposium on Operating Systems Principles, Dec. 1995, 18 pages, Association for Computing Machinery, Inc.
Anonymous, "How DFS Works: Remote File Systems," Distributed File System (DFS) Mar. 2003, 54 pages, Technical Reference retrieved from the Internet on Jan. 29, 2010, URL<http://technetmicrosoft.com/en-us/library/cc782417(WS.10,printer).aspx>.
Apple, Inc., "Mac OS X Tiger Keynote Intro. Part 2," Jun. 2004, www.youtube.com <http://www.youtube.com/watch?v=zSBJwEmRJbY>, 1 page.
Apple, Inc., "Tiger Developer Overview Series: Working with Spotlight," Nov. 23, 2004, www.apple.com using www.archive.org <http://web.archive.org/web/20041123005335/developer.apple.com/macosx/tiger/spotlight.html>, pp. 1-11.
Baer, T., et al., "The elements of Web services" ADTmag.com, Dec. 2002, pp. 1-6, (http://www.adtmag.com).
Basney et al., "Credential Wallets: A Classification of Credential Repositories Highlighting MyProxy," Sep. 19-21, 2003, pp. 1-20, 31st Research Conference on Communication, Information and Internet Policy (TPRC 2003), Arlington, Virginia.
Blue Coat, "Technology Primer: CIFS Protocol Optimization," Blue Coat Systems Inc., 2007, pp. 1-3, (http://www.bluecoat.com).
Botzum, Keys, "Single Sign On—A Contrarian View," Aug. 6, 2001, pp. 1-8, Open Group Website, http://www.opengroup.org/security/topics.htm.
Cabrera et al., "Swift: A Storage Architecture for Large Objects," In Proceedings of the—Eleventh IEEE Symposium on Mass Storage Systems, Oct. 1991, pp. 1-7.
Cabrera et al., "Swift: Using Distributed Disk Striping to Provide High I/O Data Rates," Fall 1991, pp. 405-436, vol. 4, No. 4, Computing Systems.
Cabrera et al., "Using Data Striping in a Local Area Network," 1992, 22 pages, Technical report No. UCSC-CRL-92-09 of the Computer & Information Sciences Department of University of California at Santa Cruz.
Callaghan et al., "NFS Version 3 Protocol Specifications" (RFC 1813), Jun. 1995, 127 pages, The Internet Engineering Task Force (IETN.
Carns et al., "PVFS: A Parallel File System for Linux Clusters," in Proceedings of the Extreme Linux Track: 4th Annual Linux Showcase and Conference, Oct. 2000, pp. 317-327, Atlanta, Georgia, USENIX Association.
Cavale, M. R., "Introducing Microsoft Cluster Service (MSCS) in the Windows Server 2003", Nov. 2002, 10 pages, Microsoft Corporation.
English Translation of Notification of Reason(s) for Refusal for JP 2002-556371 (Dispatch Date: Jan. 22, 2007).
F5 Networks Inc., "3-DNS® Reference Guide, version 4.5", F5 Networks Inc., Sep. 2002, pp. 2-1-2-28, 3-1-3-12, 5-1-5-24, Seattle, Washington.
F5 Networks Inc., "Big-IP® Reference Guide, version 4.5", F5 Networks Inc., Sep. 2002, pp. 11-1-11-32, Seattle, Washington.
F5 Networks Inc., "Case Information Log for 'Issues with BoNY upgrade to 4.3'", as early as Feb. 2008.
F5 Networks Inc., "Deploying the BIG-IP LTM for Diameter Traffic Management," F5® Deployment Guide, Publication date Sep. 2010, Version 1.2, pp. 1-19.
F5 Networks Inc., "F5 Diameter RM", Powerpoint document, Jul. 16, 2009, pp. 1-7.
F5 Networks Inc., "F5 WANJet CIFS Acceleration", White Paper, F5 Networks Inc., Mar. 2006, pp. 1-5, Seattle, Washington.
F5 Networks Inc., "Routing Global Internet Users to the Appropriate Data Center and Applications Using F5's 3-DNS Controller", F5 Networks Inc., Aug. 2001, pp. 1-4, Seattle, Washington, (http://www.f5.com/f5producs/3dns/relatedMaterials/UsingF5.html).
F5 Networks Inc., "Using F5's-DNS Controller to Provide High Availability Between Two or More Data Centers", F5 Networks Inc., Aug. 2001, pp. 1-4, Seattle, Washington, (http://www.f5.com/f5products/3dns/relatedMaterials/3DNSRouting.html).
Fajardo V., "Open Diameter Software Architecture," Jun. 25, 2004, pp. 1-6, Version 1.0.7.
Fan et al., "Summary Cache: A Scalable Wide-Area Protocol", Computer Communications Review, Association Machinery, New York, USA, Oct. 1998, pp. 254-265, vol. 28, Web Cache Sharing for Computing No. 4.
Farley, M., "Enterprise Storage Forum," Jan. 2000, 2 pages, Book Review—Building Storage Networks, $2^{nd}$ Edition, http://www.enterprisestorageforum.com/sans/features/print/0,,10556_1441201.00.html, Enterprise Storage Forum Staff, last accessed Dec. 20, 2002.
Gibson et al., "File Server Scaling with Network-Attached Secure Disks," in Proceedings of the ACM International Conference on Measurement and Modeling of Computer Systems (Sigmetrics '97), Association for Computing Machinery, Inc., Jun. 15-18, 1997, 13 pages.
Gibson et al., "NASD Scalable Storage Systems," Jun. 1999, 6 pages, USENIX99, Extreme Linux Workshop, Monterey, California.
Gupta et al., "Algorithms for Packet Classification," Dept. of Comput. Sci., Stanford Univ., CA 15(2):24-32 (Mar./Apr. 2001) (Abstract only).
Harrison, C., May 19, 2008 response to Communication pursuant to Article 96(2) EPC dated Nov. 9, 2007 in corresponding European patent application No. 02718824.2.
Hartman, J., "The Zebra Striped Network File System," 1994, Ph.D. dissertation submitted in the Graduate Division of the University of California at Berkeley.
Haskin et al., "The Tiger Shark File System," 1998, in proceedings of IEEE, Spring COMPCON, Santa Clara, CA, www.research.ibm.com, last accessed on Dec. 30, 2002.
Heinz, "Priorities in Stream Transmission Control Protocol (SCTP) Multistreaming," Thesis submitted to the Faculty of the University of Delaware (Spring 2003).

(56) References Cited

OTHER PUBLICATIONS

Hwang et al., "Designing SSI Clusters with Hierarchical Checkpointing and Single 1/0 Space," IEEE Concurrency, Jan.-Mar. 1999, pp. 60-69.

Ilvesmaki et al., "On the Capabilities of Application Level Traffic Measurements to Differentiate and Classify Internet Traffic," Presented in SPIE's International Symposium ITCom, Denver Colorado USA (Aug. 19-21, 2001).

International Search Report for International Patent Application No. PCT/US2008/083117 (dated Jun. 23, 2009).

International Search Report for International Patent Application No. PCT/US2008/060449 (dated Apr. 9, 2008).

International Search Report for International Patent Application No. PCT/US2008/064677 (dated Sep. 6, 2009).

International Search Report for International Patent Application No. PCT/US02/00720, dated Mar. 19, 2003.

International Search Report for International Patent Application No. PCT/US2012/038228 (dated Oct. 19, 2012).

International Search Report from International Application No. PCT/US03/41202, dated Sep. 15, 2005.

Internet Protocol, "Darpa Internet program Protocol Specification," (RFC:791) at http://www.ietf.org/rfc/rfc791.txt, by Information Sciences Institute University of Southern California, Marina del Rey, CA, for Defense Advanced Research Project Agency Information Processing Techniques Office, Arlington, VA, pp. 1-49 (Sep. 1981).

Karamanolis, C. et al., "An Architecture for Scalable and Manageable File Services," HPL-2001-173, Jul. 26, 2001. pp. 1-14.

Katsurashima, W. et al., "NAS Switch: A Novel CIFS Server Virtualization, Proceedings," 20th IEEE/11th NASA Goddard Conference on Mass Storage Systems and Technologies, 2003 (MSST 2003), Apr. 2003.

Kawamoto, D., "Amazon files for Web services patent", CNET News.com, Jul. 28, 2005, pp. 1-2, (http://news.com).

Kimball, C.E. et al., "Automated Client-Side Integration of Distributed Application Servers," 13Th LISA Conf., 1999, pp. 275-282 of the Proceedings.

Klayman, J., response filed by Japanese associate to office action dated Jan. 22, 2007 in corresponding Japanese patent application No. 2002-556371.

Klayman, J., Nov. 13, 2008 e-mail to Japanese associate including instructions for response to office action dated May 26, 2008 in corresponding Japanese patent application No. 2002-556371.

Klayman, J., Jul. 18, 2007 e-mail to Japanese associate including instructions for response to office action dated Jan. 22, 2007 in corresponding Japanese patent application No. 2002-556371.

Kohl et al., "The Kerberos Network Authentication Service (V5)," RFC 1510, Sep. 1993, 105 pages, http://www.ietf.org/ rfc/rfc1510.txt?number=1510.

Korkuzas, V., Communication pursuant to Article 96(2) EPC dated Sep. 11, 2007 in corresponding European patent application No. 02718824.2-2201, 3 pages.

LaMonica M., "Infravio spiffs up Web services registry idea", CNET News.com, May 11, 2004, pp. 1-2, (http://www.news.com).

Lelil, S., "Storage Technology News: AutoVirt adds tool to help data migration projects," Feb. 25, 2011, last accessed Mar. 17, 2011, 3 pages, <http://searchstorage.techtarget.com/news/article/0,289142,sid5_gci1527986,00.html>.

Long et al., "Swift/RAID: A distributed RAID System", Computing Systems, Summer 1994, 20 pages, vol. 7.

Mac Vittie, L., "Message-Based Load Balancing: Using F5 solutions to address the challenges of scaling Diameter, Radius, and message-oriented protocols", F5 Technical Brief, Jan. 2010, pp. 1-9, F5 Networks Inc., Seattle, Washington.

Modiano, "Scheduling Algorithms for Message Transmission Over a Satellitebroadcast System," MILCOM 97 Proceedings Lincoln Lab., MIT, Lexington, MA 2(2):628-34 (Nov. 2-5 1997) (Abstract only).

Nichols, et al., "Definition of the Differentiated Services Field (DS Field) in the IPv4 and IPv6 Headers," (RFC:2474) at http://www.ietf.org/rfc/rfc2474.txt, pp. 1-19 (Dec. 1998).

Noghani et al., "A Novel Approach to Reduce Latency on the Internet: 'Component-Based Download'," Proceedings of the Computing, Las Vegas, NV, Jun. 2000, pp. 1-6 on the Internet: Intl Conf. on Internet.

Norton et al., "CIFS Protocol Version CIFS-Spec 0.9," 2001, 125 pages, Storage Networking Industry Association (SNIA), www.snia.org, last accessed on Mar. 26, 2001.

Novotny et al., "An Online Credential Repository for the Grid: MyProxy," 2001, pp. 1-8.

Ott et al., "A Mechanism for TCP-Friendly Transport-level Protocol Coordination," Proceedings of the General Track of the Annual Conference on USENIX Annual Technical Conference (Jun. 2002).

Padmanabhan, "Using Predictive Prefething to Improve World Wide Web Latency," '96, SIGCOM, all pages (1-15).

Pashalidis et al., "A Taxonomy of Single Sign-On Systems," 2003, pp. 1-16, Royal Holloway, University of London, Egham Surray, TW20, 0EX, United Kingdom.

Pashalidis et al., "Impostor: A Single Sign-On System for Use from Untrusted Devices," Global Telecommunications Conference, 2004, GLOBECOM '04, IEEE, Issue Date: Nov. 29-Dec. 3, 2004, 5 pages, Royal Holloway, University of London.

Patterson et al., "A case for redundant arrays of inexpensive disks (RAID)", Chicago, Illinois, Jun. 1-3, 1998, pp. 109-116, in Proceedings of ACM SIGMOD conference on the Management of Data, Association for Computing Machinery, Inc.

Pearson, P.K., "Fast Hashing of Variable-Length Text Strings," Comm. of the ACM, Jun. 1990, pp. 677-680, vol. 33, No. 6.

Peterson, M., "Introducing Storage Area Networks," Feb. 1998, 6 pages, InfoStor, www.infostor.com. last accessed on Dec. 20, 2002.

Preslan et al., "Scalability and Failure Recovery in a Linux Cluster File System," in Proceedings of the 4th Annual Linux Showcase & Conference, Atlanta, Georgia, Oct. 10-14, 2000, pp. 169-180 of the Proceedings, www.usenix.org/publications/library/proceedings/als2000/full_papers/preslan/presl, last accessed on Dec. 20, 2002.

Raghavan B., et al., "Cloud Control with Distributed Rate Limiting", SIGCOMM'07, Aug. 27-31, 2007, pp. 1-11, Department of Computer Science and Engineering, University of California, San Diego, CA.

Rodriguez et al., "Parallel-access for mirror sites in the Internet," InfoCom 2000. Nineteenth Annual Joint Conference of the IEEE Computer and Communications Societies. Proceedings. IEEE Tel Aviv, Israel Mar. 26-30, 2000, Piscataway, NJ, USA, IEEE, US, Mar. 26, 2000 (Mar. 26, 2000), pp. 864-873, XP010376176 ISBN: 0-7803-5880-5 p. 867, col. 2, last paragraph—p. 868, col. 1, paragraph 1.

Rosen, et al., "MPLS Label Stack Encoding," (RFC: 3032) at http://www.ietf.org/rfc/rfc3032.txt, pp. 1-22 (Jan. 2001).

RSYNC, "Welcome to the RSYNC Web Pages," Retrieved from the Internet URL: http://samba.anu.edu.ut.rsync/. (Retrieved on Dec. 18, 2009), 5 pages.

Savage, et al., "AFRAID—A Frequently Redundant Array of Independent Disks," Jan. 22-26, 1996, pp. 1-13, USENIX Technical Conference, San Diego, California.

Schilit B., "Bootstrapping Location-Enhanced Web Services", University of Washington, Dec. 4, 2003, (http://www.cs.washington.edu/news/colloq.info.html).

Seeley R., "Can Infravio technology revive UDDI?", ADTmag.comAccessed Sep. 30, 2004, (http://www.adtmag.com).

Shohoud, Y., "Building XML Web Services with VB .NET and VB 6", Addison Wesley, Sep. 17, 2002, pp. 1-14.

Sleeper B., "The Evolution of UDDI", UDDI.org White Paper, The Stencil Group, Inc., Jul. 19, 2002, pp. 1-15, San Francisco, California.

Sleeper B., "Why UDDI Will Succeed, Quietly: Two Factors Push Web Services Forward", The Stencil Group, Inc., Apr. 2001, pp. 1-7, San Francisco, California.

Snoeren A., et al., "Managing Cloud Resources:Distributed Rate Limited", Building and Programming the Cloud Workshop, Jan. 13, 2010, pp. 1-10, UCSDCSE Computer Science and Engineering.

Soltis et al., "The Design and Performance of a Shared Disk File System for IRIX," Mar. 23-26, 1998, pp. 1-17, Sixth NASA Goddard Space Flight Center Conference on Mass Storage and

(56) References Cited

OTHER PUBLICATIONS

Technologies in cooperation with the Fifteenth IEEE Symposium on Mass Storage Systems, University of Minnesota.
Soltis et al., "The Global File System," Sep. 17-19, 1996, 24 pages, in Proceedings of the Fifth NASA Goddard Space Flight Center Conference on Mass Storage Systems and Technologies, College Park, Maryland.
Sommers F., "Whats New in UDDI 3.0—Part 1", Web Services Papers, Jan. 27, 2003, pp. 1-4, (http://www.webservices.org/index.php/article/articleprint/871/-1/24/).
Sommers F., "Whats New in UDDI 3.0—Part 2", Web Services Papers, Mar. 2, 2003, pp. 1-7, (http://www.web.archive.org/web/20040620131006/).
Sommers F., "Whats New in UDDI 3.0—Part 3", Web Services Papers, Sep. 2, 2003, pp. 1-4, (http://www.webservices.org/index.php/article/articleprint/894/-1/24/).
Sorenson, K.M., "Installation and Administration: Kimberlite Cluster Version 1.1.0, Rev. Dec. 2000," 137 pages, Mission Critical Linux, http://oss.missioncriticallinux.com/kimberlite/kimberlite.pdf.
Stakutis, C., "Benefits of SAN-based file system sharing," Jul. 2000, pp. 1-4, InfoStor, www.infostor.com, last accessed on Dec. 30, 2002, Penn Well Corporation.
Thekkath et al., "Frangipani: A Scalable Distributed File System," in Proceedings of the 16th ACM Symposium on Operating Systems Principles, Oct. 1997, pp. 1-14, Association for Computing Machinery, Inc.
Traffix Systems, "Diameter Routing Agent (DRA)", Accessed Apr. 8, 2013, pp. 2-5, (http://www traffixsystems comsolutionsdiameter-routing-agent-DRA).
Traffix Systems, "Product Brochure, Traffix Signaling Deliver Controller™ (SDC)", Mar. 2011, pp. 1-11, F5 Networks Inc.
Traffix Systems, "Signaling Deliver Controller™: Control Your 4G Network", Data Sheet, Mar. 2011, pp. 1-6, F5 Networks Inc.
Traffix Systems, "Signaling Delivery Controller (SDC)", Jul. 1, 2012, pp. 2-5, (http://www traffixsystems comsolutionsSDC).
Tulloch, Mitch, "Microsoft Encyclopedia of Security," 2003, pp. 218, 300-301, Microsoft Press, Redmond, Washington.
UDDI "UDDI Version 3.0.1", UDDI Spec Technical Committee Specification, Oct. 14, 2003, pp. 1-383, uddi.org, (http://www.uddi.org/).
UDDI, "UDDI Overview", Sep. 6, 2000, pp. 1-21, uddi.org, (http://www.uddi.org/).
UDDI, "UDDI Technical White Paper," Sep. 6, 2000, pp. 1-12, uddi-org, (http://www.uddi.org/).
Uesugi, H., Nov. 26, 2008 amendment filed by Japanese associate in response to office action dated May 26, 2008 in corresponding Japanese patent application No. 2002-556371, 5 pages.
Uesugi, H., English translation of office action dated May 26, 2008 in corresponding Japanese patent application No. 2002-556371, 2 pages.
Wang, "Priority and Realtime Data Transfer Over the Best-effort Internet," University of Massachusetts Amherst Dissertation (2005) (Abstract only).
Wikipedia, "Diameter (protocol)", pp. 1-11, last accessed Oct. 27, 2010, (http://en.wikipedia.org/wiki/Diameter_(protocol)).
Wilkes, J., et al., "The HP AutoRAID Hierarchical Storage System," Feb. 1996, 29 pages, vol. 14, No. 1, ACM Transactions on Computer Systems.
Woo, "A Modular Approach to Packet Classification: Algorithms and Results," Nineteenth Annual Conference of the IEEE Computer and Communications Societies 3(3)1213-22 (Mar. 26-30, 2000).
Zayas, E., "AFS-3 Programmer's Reference: Architectural Overview," Sep. 2, 1991, 37 pages, Version 1.0 (doc. No. FS-00-D160) Transarc Corporation.
F5 Networks Inc., "BIG-IP® Local Traffic Manager™: Implementations", Manual, May 25, 2016, pp. 1-284, vol. 12.0, F5 Networks, Inc., Retrieved from the Internet:<https://support.f5.com/kb/en-us/products/big-ip_ltm/manuals/product/ltm-implementations-12-0-0.html>.
F5 Networks Inc., "F5 BIG-IP TMOS: Operations Guide", Manual, Mar. 5, 2016, pp. 1-236, F5 Networks, Inc., Retrieved from the Internet:<https://support.f5.com/kb/en-us/products/big-ip_ltm/manuals/product/f5-tmos-operations-guide.html>.
F5 Networks Inc., "BIG-IP® Local Traffic Management: Basics", Manual, Oct. 20, 2015, pp. 1-68, vol. 12.0, F5 Networks, Inc., Retrieved from the Internet:<https://support.f5.com/kb/en-us/products/big-ip_ltm/manuals/product/ltm-basics-12-0-0.html>.
F5 Networks Inc., "BIG-IP LTM and TMOS 12.0.0", Release Notes, Oct. 6, 2016, pp. 1-110, vol. 12.0, F5 Networks, Inc., Retrieved from the Internet:<https://support.f5.com/kb/en-us/products/big-ip_ltm/releasenotes/product/relnote-ltm-12-0-0.html>.
F5 Networks Inc., "BIG-IP® Analytics: Implementations", Manual, Oct. 27, 2015, pp. 1-50, vol. 12.0, F5 Networks, Inc., Retrieved from the Internet:<https://support.f5.com/kb/en-us/products/big-ip_ltm/manuals/product/ltm-basics-12-0-0.html>.

* cited by examiner

METHODS FOR IMPROVED TRANSMISSION CONTROL PROTOCOL (TCP) PERFORMANCE VISIBILITY AND DEVICES THEREOF

This application claims the benefit of U.S. Provisional Patent Application Ser. No. 62/413,488, filed on Oct. 27, 2016, which is hereby incorporated by reference in its entirety.

FIELD

This technology generally relates to network traffic management and, more particularly, to methods and devices for improved Transmission Control Protocol (TCP) performance visibility.

BACKGROUND

Network devices are often misconfigured in ways that reduce Transmission Control Protocol (TCP) performance, resulting in data loss and/or slow exchanges of data across TCP connections, for example. One exemplary network device that utilizes TCP connections is a network traffic management apparatus that may perform load balancing, application acceleration, and/or security management functions on behalf of a server pool, for example, among many other possible functions. Unfortunately, network administrators do not currently have sufficient visibility with respect to TCP connections to address performance issues exhibited by network traffic management apparatuses, such as by adjusting particular TCP configuration(s).

SUMMARY

A method for improved Transmission Control Protocol (TCP) performance implemented by a network traffic management system comprising one or more network traffic management apparatuses, client devices, or server devices, the method including generating a duration corresponding to a current one of a plurality of states in a TCP connection. The duration is generated based on a difference between a stored time recorded at a previous transition to the current one of the states and a current time. The duration is stored or output as associated with the current one of the states. The stored time recorded at the previous transition to the current one of the states is then replaced with the current time. A determination is made when one or more TCP configurations should be modified based on the duration for the current one of the states. The one or more TCP configurations are automatically modified to improve TCP performance, when the determining indicates that the one or more TCP configurations should be modified.

A network traffic management apparatus, comprising memory comprising programmed instructions stored thereon and one or more processors configured to be capable of executing the stored programmed instructions to generate a duration corresponding to a current one of a plurality of states in a TCP connection. The duration is generated based on a difference between a stored time recorded at a previous transition to the current one of the states and a current time. The duration is stored or output as associated with the current one of the states. The stored time recorded at the previous transition to the current one of the states is then replaced with the current time. A determination is made when one or more TCP configurations should be modified based on the duration for the current one of the states. The one or more TCP configurations are automatically modified to improve TCP performance, when the determining indicates that the one or more TCP configurations should be modified.

A non-transitory computer readable medium having stored thereon instructions for improved TCP performance comprising executable code which when executed by one or more processors, causes the processors to generate a duration corresponding to a current one of a plurality of states in a TCP connection. The duration is generated based on a difference between a stored time recorded at a previous transition to the current one of the states and a current time. The duration is stored or output as associated with the current one of the states. The stored time recorded at the previous transition to the current one of the states is then replaced with the current time. A determination is made when one or more TCP configurations should be modified based on the duration for the current one of the states. The one or more TCP configurations are automatically modified to improve TCP performance, when the determining indicates that the one or more TCP configurations should be modified.

A network traffic management system, comprising one or more network traffic management apparatuses, client devices, or server devices, the network traffic management system comprising memory comprising programmed instructions stored thereon and one or more processors configured to be capable of executing the stored programmed instructions to generate a duration corresponding to a current one of a plurality of states in a TCP connection. The duration is generated based on a difference between a stored time recorded at a previous transition to the current one of the states and a current time. The duration is stored or output as associated with the current one of the states. The stored time recorded at the previous transition to the current one of the states is then replaced with the current time. A determination is made when one or more TCP configurations should be modified based on the duration for the current one of the states. The one or more TCP configurations are automatically modified to improve TCP performance, when the determining indicates that the one or more TCP configurations should be modified.

This technology has a number of associated advantages including providing methods, non-transitory computer readable media, network traffic management apparatuses, and network traffic management systems that more effectively and automatically adjust TCP configurations to improve performance of managed TCP connections. With this technology, durations that TCP connections are in particular states can be determined and analyzed to identify particular configurations that could be adjusted to improve performance. As a result, this technology facilitates reduced latency and improved network communications.

DETAILED DESCRIPTION

Figure 1:
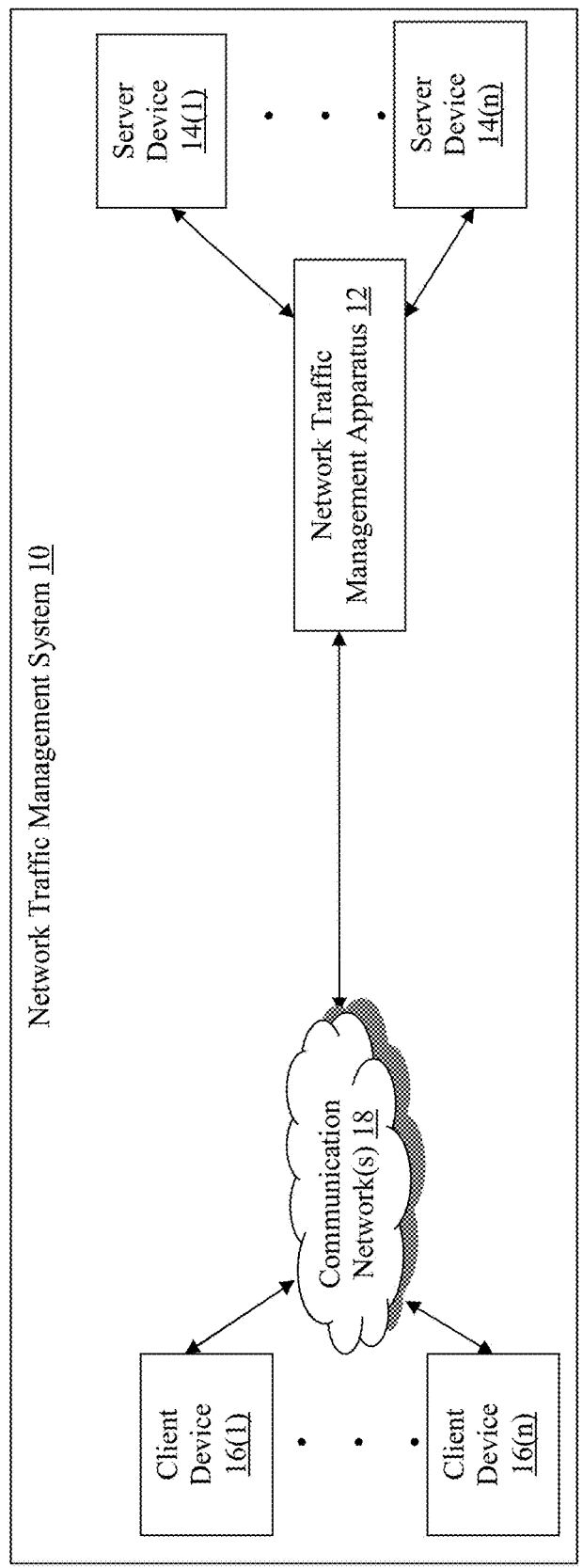
FIG. 1 is a block diagram of an exemplary network traffic management system with an network traffic management apparatus.

Referring to FIG. 1, an exemplary network traffic management system 10, which incorporates an exemplary network traffic management apparatus 12, is illustrated. In this example, the network traffic management apparatus 12 is coupled to a plurality of server devices 14(1)-14(n) and a plurality of client devices 16(1)-16(n) via communication network(s) 18, although the network traffic management apparatus 12, server devices 14(1)-14(n), and/or client devices 16(1)-16(n) may be coupled together via other topologies. Additionally, the network traffic management system 10 may include other network devices such as one or more routers and/or switches, for example, which are well known in the art and thus will not be described herein. This technology provides a number of advantages including methods, non-transitory computer readable media, network traffic management systems, and network traffic management apparatuses that analyze TCP connections and associated state changes to facilitate improved TCP performance.

Figure 2:
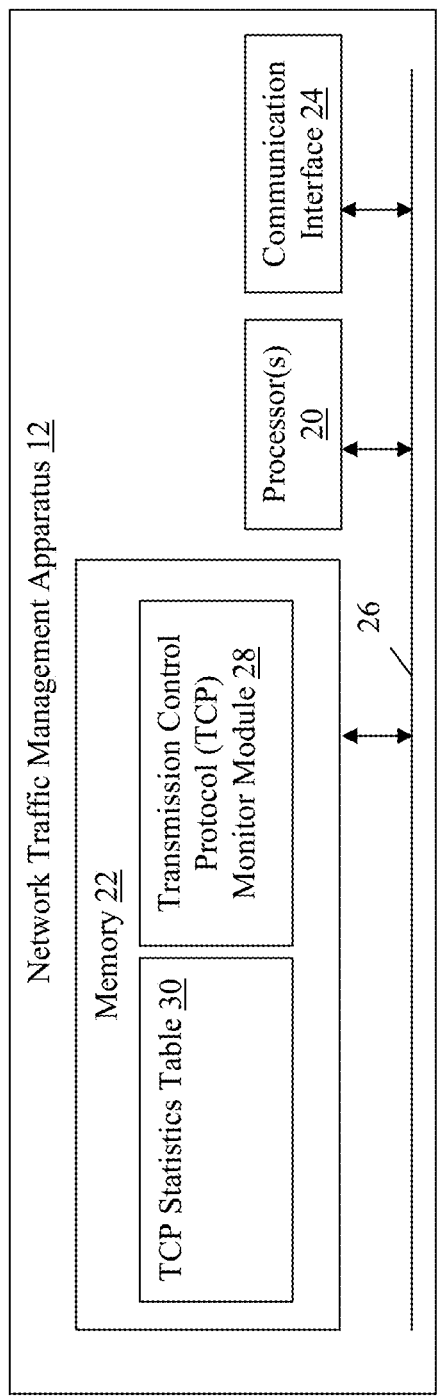
FIG. 2 is a block diagram of an exemplary network traffic management apparatus.

Referring to FIGS. 1-2, the network traffic management apparatus 12 of the network traffic management system 10 may perform any number of functions including managing network traffic, load balancing network traffic across the server devices 14(1)-14(n), and/or accelerating network traffic associated with applications hosted by the server devices 14(1)-14(n), for example. The network traffic management apparatus 12 in this example includes one or more processors 20, a memory 22, and/or a communication interface 24, which are coupled together by a bus 26 or other communication link, although the network traffic management apparatus 12 can include other types and/or numbers of elements in other configurations.

The processor(s) 20 of the network traffic management apparatus 12 may execute programmed instructions stored in the memory 22 of the network traffic management apparatus 12 for the any number of the functions identified above. The processor(s) 20 of the network traffic management apparatus 12 may include one or more CPUs or general purpose processors with one or more processing cores, for example, although other types of processor(s) can also be used.

The memory 22 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 20, can be used for the memory 22.

Figure 3:
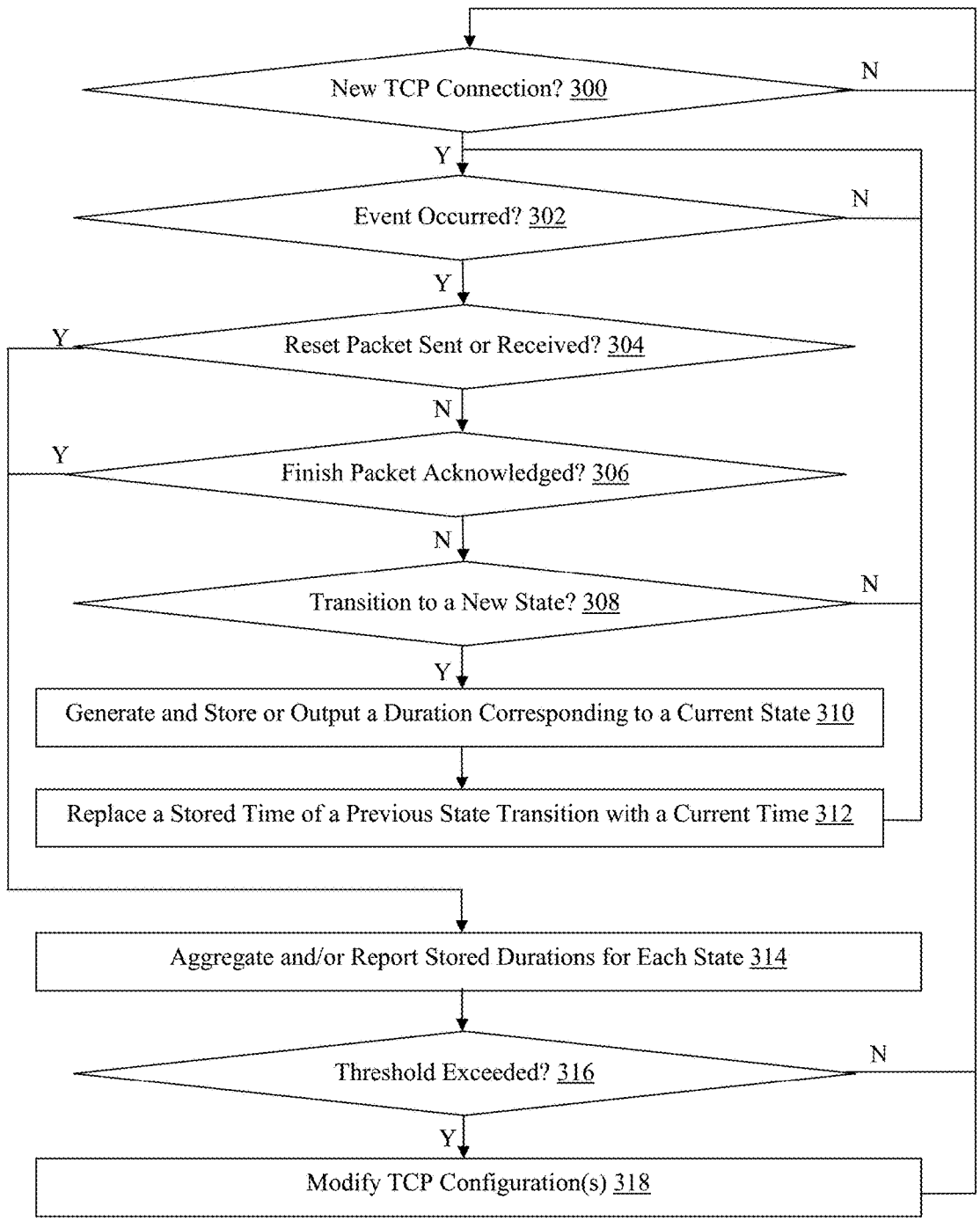
FIG. 3 is a flowchart of an exemplary method for determining state durations in a Transmission Control Protocol (TCP) connection.

Accordingly, the memory 22 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-4. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application (s) may be running in one or more virtual machines (VMs) executing on the network traffic management apparatus 12. Additionally, in one or more embodiments of this technology, virtual machine(s) running on the network traffic management apparatus 12 may be managed or supervised by a hypervisor.

In this particular example, the memory 22 of the network traffic management apparatus 12 includes a TCP monitor module 28 and a TCP statistics table 30, although the memory 22 can include other policies, modules, databases, tables, data structures, or applications, for example. The TCP monitor module 28 in this example is configured to monitor TCP connections with the client devices 16(1)-16(n) and/or server devices 14(1)-14(n). In particular, the TCP monitor module 28 is configured to identify state transitions associated with TCP connections and the duration that the network traffic management apparatus 12 is in each state, as described and illustrated in more detail later.

The TCP statistics table 30 in this example stores the duration associated with each state as well as a time of a previous transition for each monitored TCP connection. Optionally, the TCP statistics table 30 can facilitate reporting of the durations and/or transitions, which can be aggregated by entities and combined with an application visibility and reporting module of the network traffic management apparatus 12 storing additional performance information and/or statistics. Other information can also be stored in the TCP statistics table 30 and TCP state duration data can also be stored in other manners in other examples.

The communication interface 24 of the network traffic management apparatus 12 operatively couples and communicates between the network traffic management apparatus 12, the server devices 14(1)-14(n), and/or the client devices 16(1)-16(n), which are all coupled together by the communication network(s) 18, although other types and/or numbers of communication networks or systems with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 in this example can employ any suitable interface mechanisms and network communication technologies including, for example, tele-traffic in any suitable form (e.g., voice, modem, and the like), Public Switched Telephone Network (PSTNs), Ethernet-based Packet Data Networks (PDNs), combinations thereof, and the like. The communication network(s) 18 can also include direct connection(s) (e.g., for when a device illustrated in FIG. 1, such as the network traffic management apparatus 12, one or more of the client devices 16(1)-16(n), or one or more of the server devices 14(1)-14(n) operate as virtual instances on the same physical machine).

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one of the server devices 14(1)-14(n), for example. Moreover, one or more of the devices of the network traffic management apparatus 12 in these examples can be in a same or a different communication network including one or more public, private, or cloud networks, for example.

Each of the server devices 14(1)-14(n) of the network traffic management system 10 in this example includes one or more processors, a memory, and a communication interface, which are coupled together by a bus or other communication link, although other numbers and/or types of network devices could be used. The server devices 14(1)-14(n) in this example process requests received from the client devices 16(1)-16(n) via the communication network(s) 18 according to the HTTP-based application RFC protocol, for example. Various applications may be operating on the server devices and transmitting data (e.g., files or Web pages) to the client devices 16(1)-16(n) via the network traffic management apparatus 12 in response to requests from the client devices 16(1)-16(n). The server devices 14(1)-14(n) may be hardware or software or may represent a system with multiple servers in a pool, which may include internal or external networks.

Although the server devices 14(1)-14(n) are illustrated as single devices, one or more actions of each of the server devices 14(1)-14(n) may be distributed across one or more distinct network computing devices that together comprise one or more of the server devices 14(1)-14(n). Moreover, the server devices 14(1)-14(n) are not limited to a particular configuration. Thus, the server devices 14(1)-14(n) may contain a plurality of network computing devices that operate using a master/slave approach, whereby one of the network computing devices of the server devices 14(1)-14(n) operate to manage and/or otherwise coordinate operations of the other network computing devices. The server devices 14(1)-14(n) may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, one or more of the server devices 14(1)-14(n) can operate within the network traffic management apparatus 12 itself rather than as a stand-alone server device communicating with the network traffic management apparatus 12 via the communication network(s). In this example, the one or more server devices 14(1)-14(n) operate within the memory 22 of the network traffic management apparatus 12.

The client devices 16(1)-16(n) of the network traffic management system 10 in this example include any type of computing device that can send and receive packets using TCP connections via the communication network(s) 18, such as mobile computing devices, desktop computing devices, laptop computing devices, tablet computing devices, virtual machines (including cloud-based computers), or the like. Each of the client devices 16(1)-16(n) in this example includes a processor, a memory, and a communication interface, which are coupled together by a bus or other communication link, although other numbers and/or types of network devices could be used.

The client devices 16(1)-16(n) may run interface applications, such as standard Web browsers or standalone client applications, which may provide an interface to make requests for, and receive content stored on, one or more of the server devices 14(1)-14(n) via the communication network(s) 18. The client devices 16(1)-16(n) may further include a display device, such as a display screen or touchscreen, and/or an input device, such as a keyboard for example.

Although the exemplary network traffic management system 10 with the network traffic management apparatus 12, server devices 14(1)-14(n), client devices 16(1)-16(n), and communication network(s) 18 are described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the network traffic management apparatus 12, client devices 16(1)-16(n), or server devices 14(1)-14(n), for example, may be configured to operate as virtual instances on the same physical machine. In other words, one or more of the network traffic management apparatus 12, client devices 16(1)-16(n), or server devices 14(1)-14(n) may operate on the same physical device rather than as separate devices communicating through communication network(s). Additionally, there may be more or fewer network traffic management apparatuses, client devices, or server devices than illustrated in FIG. 1. The client devices 16(1)-16(n) could also be implemented as applications on the network traffic management apparatus 12 itself as a further example.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

An exemplary method of facilitating improved TCP connection performance will now be described with reference to FIGS. 1-4. Referring more specifically to FIG. 3, an exemplary method for determining state durations in a TCP connection is illustrated. Although steps 300-314 are described and illustrated herein as being performed by the network traffic management apparatus 12 of the network traffic management system 10, one or more other devices of the network traffic management system 10, such as one or more of the client devices 16(1)-16(n) or server devices 14(1)-14(n), for example, can also perform one or more of steps 300-314 in other examples.

In step 300 in this example, the network traffic management apparatus 12 determines whether a new TCP connection has been initiated with a remote network device, such as one of the client devices 16(1)-16(n) or one of the server devices 14(1)-14(n), for example. In some examples, a synchronization packet or SYN message received by the network traffic management apparatus 12 can initiate a three way handshake and a new TCP connection. If the network traffic management apparatus 12 determines that a new TCP connection has not been initiated, then the No branch is taken back to step 300 and the network traffic management apparatus 12 effectively waits for a new TCP connection to be initiated. However, if the network traffic management apparatus 12 determines in step 300 that a new TCP connection has been initiated, then the Yes branch is taken to step 302.

In step 302 in this example, the network traffic management apparatus 12 determines whether an event has occurred with respect to the TCP connection. In some examples, the event can be one or more of sending a packet via the TCP connection, receiving data at the TCP stack from an upper layer, expiration of a TCP timer, or receiving a packet via the TCP connection, such as an acknowledgement packet or ACK message, although other types of events can be used in other examples. If the network traffic management apparatus 12 determines that an event has not occurred with respect to the TCP connection, then the No branch is taken back to step 302 and the network traffic management apparatus effectively waits for an event. However, if the network traffic management apparatus 12 determines in step 302 that an event has occurred with respect to the TCP connection, then the Yes branch is taken to step 304.

In step 304 in this example, the network traffic management apparatus 12 determines whether the event corresponds with a reset packet or RST message that has been sent or received, which indicates an end to the statistical data collection for the TCP connection, which is described and illustrated in more detail later. If the network traffic management apparatus 12 determines that the event is not the sending or receiving of an RST message, then the No branch is taken to step 306.

In step 306 in this example, the network traffic management apparatus 12 determines whether the event corresponds with an acknowledgement, by the remote network device associated with the TCP connection, of a finish packet or FIN message sent by the network traffic management apparatus. If a FIN message has been acknowledged by the remote network device, then the TCP connection is effectively closed, and the statistical data collection for the TCP connection, which is described and illustrated in more detail later, can be stopped. Accordingly, if the network traffic management apparatus 12 determines that the event is not the receiving of an acknowledgement of a sent FIN message, then the No branch is taken to step 308.

In step 308 in this example, the network traffic management apparatus determines whether the event corresponds with a transition to a new state in the TCP connection. One exemplary method for determining whether the TCP connection has transitioned to a new state is described and illustrated in more detail later with reference to FIG. 4. Exemplary states include three way handshake, rate pace, receive window, congestion window, send buffer, Nagle, retransmission, wait for acknowledgement, closing, and application states, although other numbers and types of states can be used in other examples.

If the network traffic management apparatus 12 determines that the TCP connection has not transitioned to a new state based on the event, then the No branch is taken back to step 302 and the network traffic management apparatus 12 again waits for another event to occur with respect to the TCP connection. However, in this particular example, if the network traffic management apparatus 12 determines in step 308 that the TCP connection has transitioned to a new state, then the Yes branch is taken to step 310. In other examples, the network traffic management apparatus 12 may exit step 308 based on a timer elapsing. In these examples, statistics can be generated, as described and illustrated in more detail later, even though state transition are not occurring.

In step 310 in this example, the network traffic management apparatus 12 generates a duration corresponding to a current state. In some examples, the duration is generated based on a difference between a stored time of a previous transition to the current state and a current time. Accordingly, the network traffic management apparatus 12 stores in the memory 22 a timestamp associated with an immediately prior state transition to a current state, which can be compared to a current time to determine a duration in which the TCP connection was in the current state before the TCP connection transitioned to the new state. The network traffic management apparatus 12 can store the generated duration in the TCP statistics table 30 along with an indication of the current state and, optionally, an indication of the TCP connection or one or more parameters associated with the TCP connection, for example.

In step 312, the network traffic management apparatus 12 replaces the stored time of the previous state transition with the current time so that in a subsequent iteration the network traffic management apparatus 12 can determine in step 310 a duration in which the TCP connection was in the new state. Subsequent to replacing the stored time of the previous state transition, the network traffic management apparatus 12 proceeds back to step 302 and again waits for a determination that an event has occurred with respect to the TCP connection.

Referring back to steps 304 and 306, if the network traffic management apparatus 12 determines that the event is the sending or receiving of an RST message or the receiving of an acknowledgement of a sent FIN message, respectively, then one of the Yes branches is taken to step 314. In step 314, the network traffic management apparatus 12 aggregates or reports durations for each of the states that the TCP connection was in while the TCP connection was open, which are maintained in the TCP statistics table 30.

Accordingly, the network traffic management apparatus 12 can aggregate the total time a TCP connection was in a particular state for states to which the TCP connection transitioned. In another example, the network traffic management apparatus can aggregate the duration statistics for a particular TCP connection with one or more other TCP connections associated with a same entity (e.g., geographic location or IP address of remote network device), such as by providing the duration statistics to an application, visibility, and reporting module of the network traffic management apparatus 12 for example.

In yet other examples, the network traffic management apparatus 12 can output the duration statistics to a file or other data structure that is accessible to an administrator, such as in response to a query via a provided interface. The duration statistics can also be aggregated or reported in different ways in other examples. While the duration statistics are aggregated or reported following the closing of a TCP connection in this example, the duration statistics can also be aggregated or reported at specified time intervals or at other times in other examples.

In step 316, the network traffic management apparatus 12 optionally determines whether a duration for any of the states exceeds a configurable threshold (e.g., percentage of total connection time for the TCP connection). In some examples, the network traffic management apparatus 12 can execute a daemon or other process that analyzes the accumulated durations for each state with respect to a stored policy of configurable thresholds. Accordingly, if the network traffic management apparatus 12 determines that a threshold is exceeded for at least one state, then the Yes branch is taken to step 318.

In step 318, the network traffic management apparatus 12 optionally modifies one or more TCP configurations automatically or based on a stored policy. In one particular example, the network traffic management apparatus 12 can disable Nagle's algorithm when the duration associated with the Nagle state for one or more TCP connections exceeds a configurable threshold of 5% of the total connection time for the TCP connection(s). Other types of thresholds, policies, and automated modifications to the TCP configuration(s) can also be used in other examples.

Subsequent to modifying the TCP configuration(s), or if the network traffic management apparatus 12 determines in step 316 that a threshold is not exceeded for any of the states and the No branch is taken, then the network traffic management apparatus 12 proceeds back to step 300. Additionally, steps 302-318 can be performed in parallel for any number of TCP connections in other examples.

Figure 4:
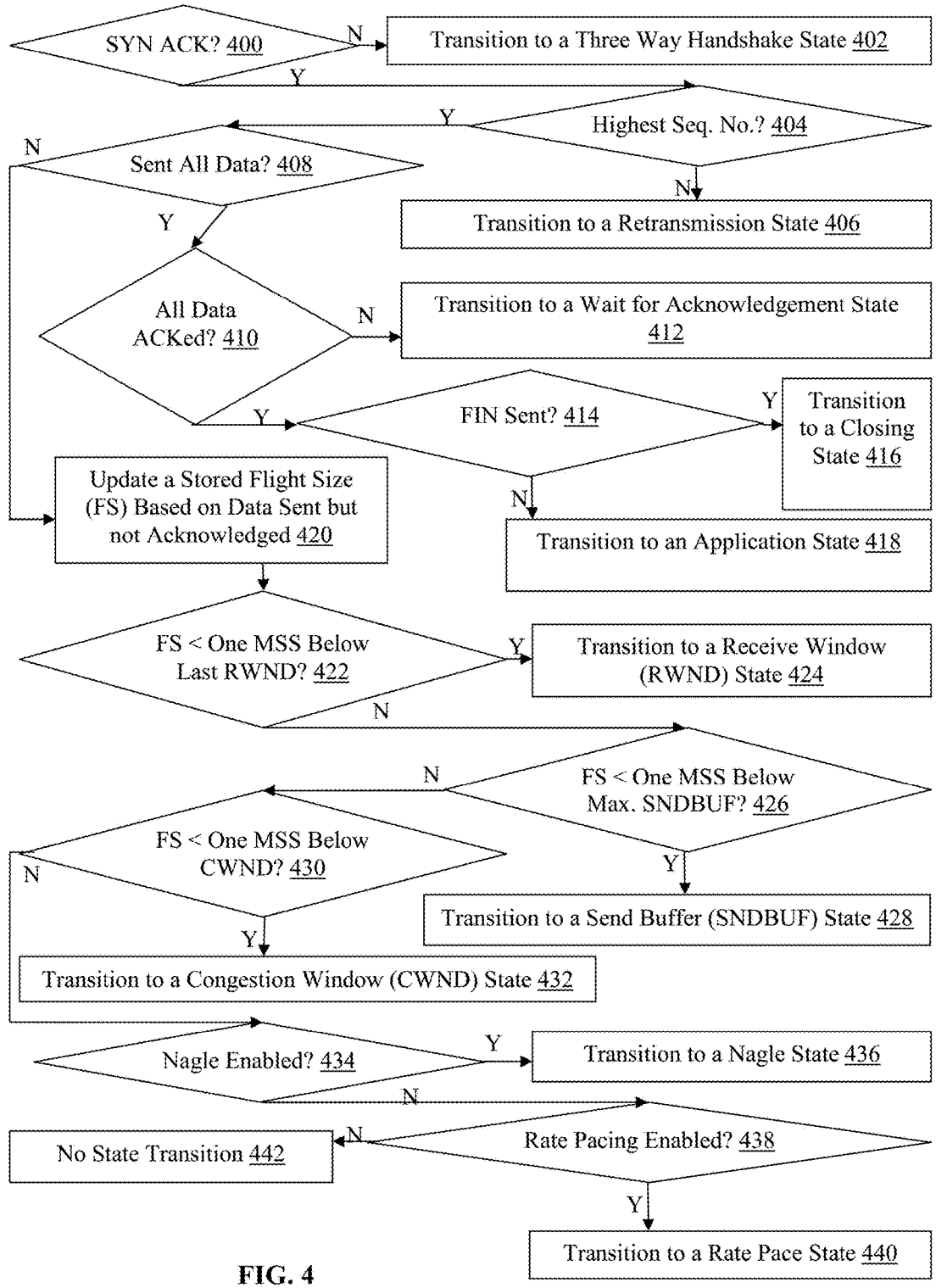
FIG. 4 is a flowchart of an exemplary method for determining whether a TCP connection has transitioned to a new state.

Referring more specifically to FIG. 4, an exemplary method for determining whether a TCP connection has transitioned to a new state is illustrated. While FIG. 4 illustrates a plurality of exemplary monitored states for which durations can be determined, any number of states can be monitored in a TCP connection in other examples. Additionally, FIG. 4 illustrates an exemplary order in which state transitions are analyzed, although the conditions for a state transition can be analyzed in other orders in other examples. Although steps 400-442 are described and illustrated herein as being performed by the network traffic management apparatus 12, one or more other devices of the network traffic management system 10, such as one or more of the client devices 16(1)-16(n) or server devices 14(1)-14(n), for example, can also perform one or more of steps 400-442 in other examples.

In step 400 in this example, the network traffic management apparatus 12 determines whether an ACK message has been received from a remote network device in response to a SYN message sent to the remote network device. The remote network device in this example can be one of the client devices 16(1)-16(n), one of the server devices 14(1)-14(n) or any other network device within or external to the network traffic management system 10. If the network traffic management apparatus 12 determines that it has not received an ACK message from a remote network device in response to a SYN message, then the No branch is taken to step 402.

In step 402, the network traffic management apparatus 12 determines that the TCP connection is transitioning to a three way handshake state. In this example, the three way handshake is an initial state, which cannot be transitioned to from any other state. Accordingly, the network traffic management apparatus 12 can set or store an initial time of transition to the three way handshake based on a current time, which can be used to determine the duration the TCP connection is in the three way handshake state, as described and illustrated in more detail earlier with reference to steps 310-312.

However, if the network traffic management apparatus 12 determines in step 400 that it has received an ACK message from a remote network device in response to a SYN message sent to the remote network device, then the Yes branch is taken to step 404. In step 404, the network traffic management apparatus 12 determines whether the most recent sent packet is not associated with the highest sequence number that has been observed for the TCP connection.

In this example, the network traffic management apparatus 12 maintains, such as in the memory 22, an indication of the sequence number that have been used in the context of the TCP connection. Accordingly, if the network traffic management apparatus 12 determines that a sent packet is not associated with a highest sequence number, then the sent packet is a retransmission and the No branch is taken to step 406. In step 406, the network traffic management apparatus 12 determines that the TCP connection is transitioning to a retransmission state.

However, if the network traffic management apparatus 12 determines in step 404 that the most recent sent packet is associated with the highest sequence number that has been observed for the TCP connection, then the Yes branch is taken to step 408 and, optionally, the stored highest sequence number is incremented. In step 408, the network traffic management apparatus 12 determines whether it has sent all available data or whether there is data waiting in the memory 22 to be sent via the TCP connection to the remote network device. If the network traffic management apparatus 12 determines that all available data has been sent, then the Yes branch is taken to step 410.

In step 410, the network traffic management apparatus 12 determines whether all of the data sent to the remote network device has been acknowledged. If the network traffic management apparatus 12 determines that all of the data has been acknowledged, then the Yes branch is taken to step 412. In step 412, the network traffic management apparatus 12 determines that the TCP connection is transitioning to a wait for acknowledgement state. However, if the network traffic management apparatus 12 determines in step 410 that all of the data sent to the remote network device has not been acknowledged, then the No branch is taken to step 414.

In step 414, the network traffic management apparatus 12 determines whether a FIN message has been sent to the remote network device. If all of the data sent to the remote network device has been acknowledged, but a FIN message has not been sent, then the network traffic management apparatus 12 is waiting for additional data, such as from an upper layer or an application.

Accordingly, if the network traffic management apparatus 12 determines that a FIN message has been sent, then the Yes branch is taken to step 416. In step 416, the network traffic management apparatus 12 determines that the TCP connection is transitioning to a closing state, indicating that the network traffic management apparatus 12 is waiting on an acknowledgement of the FIN message and for the TCP connection to close. If the FIN message has been acknowledged, then the network traffic management apparatus 12 does not determine whether the TCP connection has transitioned to a new state based on the analysis of FIG. 4, as described and illustrated in more detail earlier with reference to step 306 of FIG. 3.

However, if the network traffic management apparatus 12 determines in step 414 that a FIN message has not been sent to the remote network device, then the No branch is taken to step 418. In step 418, the network traffic management apparatus 12 determines that the TCP connection is transitioning to an application state indicating that the network traffic management apparatus 12 is waiting on an application for more data.

Referring back to step 408, if the network traffic management apparatus 12 determines that all available data has not been sent, then the No branch is taken to step 420. In step 420, the network traffic management apparatus 12 updates a stored flight size based on a size of the data sent to the remote network device, but not yet acknowledged by the remote network device. The current flight size associated with the TCP connection, as well as the current total size of data sent but unacknowledged, can be stored in the memory 22 of the network traffic management apparatus 12, for example.

In step 420, the network traffic management apparatus 12 determines whether the flight size is less than one maximum segment size (MSS) below the last advertised receive window of the remote network device. If the network traffic management apparatus 12 determines that the flight size is less than one maximum segment size below the last advertised receive window of the remote network device, then the Yes branch is taken to step 424. In step 424, the network traffic management apparatus 12 determines that the TCP connection is transitioning to a receive window state.

However, if the network traffic management apparatus 12 determines in step 422 that the flight size is not less than one maximum segment size (MSS) below the last advertised receive window (RWND) of the remote network device, then the No branch is taken to step 426. In step 426, the network traffic management apparatus 12 determines whether the flight size is less than one maximum segment size below a maximum send buffer size for the TCP connection.

If the network traffic management apparatus 12 determines that the flight size is less than one maximum segment size below a maximum send buffer size for the TCP connection, then the Yes branch is taken to step 428. In step 428, the network traffic management apparatus 12 determines that the TCP connection is transitioning to a send buffer state.

However, if the network traffic management apparatus 12 determines in step 426 that the flight size is not less than one maximum segment size below a maximum send buffer size for the TCP connection, then the No branch is taken to step 430. In step 430, the network traffic management apparatus 12 determines whether the flight size is less than one maximum segment size below a size of a current congestion window for the TCP connection, such as can be determined by a congestion control algorithm that is currently implemented for the TCP connection.

If the network traffic management apparatus 12 determines that the flight size is less than one maximum segment size below the size of the current congestion window for the TCP connection, then the Yes branch is taken to step 432. In step 432, the network traffic management apparatus 12 determines that the TCP connection is transitioning to a congestion window state.

However, if the network traffic management apparatus 12 determines in step 430 that the flight size is not less than one maximum segment size below a size of a current congestion window for the TCP connection, then the No branch is taken to step 434. In step 434, the network traffic management apparatus 12 determines whether the Nagle algorithm is enabled and there is unsent data in memory of less than one maximum segment size.

If the network traffic management apparatus 12 determines that the Nagle algorithm is enabled and there is unsent data in the memory 22 of less than one maximum segment size, then the Yes branch is taken to step 436. In step 436, the network traffic management apparatus 12 determines that the TCP connection is transitioning to a Nagle state.

However, if the network traffic management apparatus 12 determines in step 434 that use of a Nagle algorithm is not enabled or there is not unsent data in the memory 22 of less than one maximum segment size then the No branch is taken to step 438. In step 438, the network traffic management apparatus 12 determines whether there is an active process limiting the rate at which packets exit in order to conform to link bandwidth and there is unsent data in the memory 22.

If the network traffic management apparatus 12 determines that there is an active process limiting the rate at which packets exit in order to conform to link bandwidth and there is unsent data in the memory 22, then the Yes branch is taken to step 440. In step 440, the network traffic management apparatus 12 determines that the TCP connection is transitioning to a rate pace state.

However, if the network traffic management apparatus 12 determines in step 438 that there is an active process limiting the rate at which packets exit in order to conform to link bandwidth or there is no unsent data in the memory 22, then the No branch is taken to step 442. In step 442, the network traffic management apparatus 12 determines that the TCP connection is not transitioning states.

Accordingly, in this particular example, steps 400-442 are performed by the network traffic management apparatus 12 for each determination of an event, as described and illustrated earlier with reference to step 302 of FIG. 3, for which the conditions described and illustrated earlier with reference to steps 304 and 306 of FIG. 3 are not satisfied. Other types and numbers of conditions or states or other methods of determining whether a state transition has occurred in a TCP connection can also be used in other examples.

By generating and providing statistics regarding the duration that TCP connection(s) are in particular states, network administrators can more effectively identify the delays that may be occurring in the TCP connection(s). Additionally, by identifying the types of delays and associated durations, administrators can advantageously adjust, and/or network traffic management apparatuses can automatically adjust, TCP configuration(s) in order to reduce the delays (e.g., disable the Nagle algorithm), and thereby improve TCP performance.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for improved transmission control protocol (TCP) performance implemented by a network traffic management system comprising one or more network traffic management apparatuses, client devices, or server devices, and the method comprising:

monitoring a TCP connection to determine when an event and a current transition from a previous state to a new state have occurred in the TCP connection and, when the determination indicates that the event and the current transition from the previous state to the new state have occurred in the TCP connection:

generating a duration corresponding to the previous state;

determining, based on the generated duration, when one or more TCP configurations require modification; and automatically modifying the one or more TCP configurations to improve TCP performance, when the determination indicates that the one or more TCP configurations require modification.

2. The method of claim 1, further comprising:

generating the duration based on a difference between a stored time recorded at a previous transition to the previous state and a current time of the current transition; and replacing the stored time with the current time.

3. The method of claim 1, wherein the event comprises one or more of sending a packet, receiving data from an upper layer, expiration of a TCP timer, or receiving another packet comprising an acknowledgement.

4. The method of claim 1, further comprising storing or outputting the generated duration as associated with the previous state.

5. The method of claim 1, further comprising:

determining when a reset packet has been received or an acknowledgement packet has been received in response to a finish packet; and outputting the stored duration or another stored duration corresponding to one or more other states, when the determination indicates that the reset packet has been received or the acknowledgement packet has been received in response to the finish packet.

6. A network traffic management apparatus, comprising memory comprising programmed instructions stored thereon and one or more processors configured to be capable of executing the stored programmed instructions to:

monitor a TCP connection to determine when an event and a current transition from a previous state to a new state have occurred in the TCP connection and, when the determination indicates that the event and the current transition from the previous state to the new state have occurred in the TCP connection:

generate a duration corresponding to the previous state;

determine, based on the generated duration, when one or more TCP configurations require modification; and automatically modify the one or more TCP configurations to improve TCP performance, when the determination indicates that the one or more TCP configurations require modification.

7. The network traffic management apparatus of claim 6, wherein the one or more processors are further configured to be capable of executing the stored programmed instructions to:

generate the duration based on a difference between a stored time recorded at a previous transition to the previous state and a current time of the current transition; and replace the stored time with the current time.

8. The network traffic management apparatus of claim 6, wherein the event comprises one or more of sending a packet, receiving data from an upper layer, expiration of a TCP timer, or receiving another packet comprising an acknowledgement.

9. The network traffic management apparatus of claim 6, wherein the one or more processors are further configured to be capable of executing the stored programmed instructions to store or output the generated duration as associated with the previous state.

10. The network traffic management apparatus of claim 6, wherein the one or more processors are further configured to be capable of executing the stored programmed instructions to:

determine when a reset packet has been received or an acknowledgement packet has been received in response to a finish packet; and output the stored duration or another stored duration corresponding to one or more other states, when the determination indicates that the reset packet has been received or the acknowledgement packet has been received in response to the finish packet.

11. A non-transitory computer readable medium having stored thereon instructions for improved transmission control protocol (TCP) performance comprising executable code which when executed by one or more processors, causes the one or more processors to:

monitor a TCP connection to determine when an event and a current transition from a previous state to a new state have occurred in the TCP connection and, when the determination indicates that the event and the current transition from the previous state to the new state have occurred in the TCP connection:

generate a duration corresponding to the previous state;

determine, based on the generated duration, when one or more TCP configurations require modification; and automatically modify the one or more TCP configurations to improve TCP performance, when the determination indicates that the one or more TCP configurations require modification.

12. The non-transitory computer readable medium of claim 11, wherein the executable code when executed by the one or more processors further causes the one or more processors to:

generate the duration based on a difference between a stored time recorded at a previous transition to the previous state and a current time of the current transition; and replace the stored time with the current time.

13. The non-transitory computer readable medium of claim 11, wherein the event comprises one or more of sending a packet, receiving data from an upper layer, expiration of a TCP timer, or receiving another packet comprising an acknowledgement.

14. The non-transitory computer readable medium of claim 11, wherein the executable code when executed by the one or more processors further causes the one or more processors to store or output the generated duration as associated with the previous state.

15. The non-transitory computer readable medium of claim 11, wherein the executable code when executed by the one or more processors further causes the one or more processors to:
  determine when a reset packet has been received or an acknowledgement packet has been received in response to a finish packet; and
  output the stored duration or another stored duration corresponding to one or more other states, when the determination indicates that the reset packet has been received or the acknowledgement packet has been received in response to the finish packet.

16. A network traffic management system, comprising one or more traffic management apparatuses, client devices, or server devices, memory comprising programmed instructions stored thereon, and one or more processors configured to be capable of executing the stored programmed instructions to, when a determination indicates that an event and a current transition from a previous state to a new state have occurred in a monitored transmission control protocol (TCP) connection:
  generate a duration corresponding to the previous state; and
  automatically modify one or more TCP configurations to improve TCP performance, when a determination based on the generated duration indicates that the one or more TCP configurations require modification.

17. The network traffic management system of claim 16, wherein the one or more processors are further configured to be capable of executing the stored programmed instructions to:
  generate the duration based on a difference between a stored time recorded at a previous transition to the previous state and a current time of the current transition; and
  replace the stored time with the current time.

18. The network traffic management system of claim 16, wherein the event comprises one or more of sending a packet, receiving data from an upper layer, expiration of a TCP timer, or receiving another packet comprising an acknowledgement.

19. The network traffic management system of claim 16, wherein the one or more processors are further configured to be capable of executing the stored programmed instructions to store or output the generated duration as associated with the previous state.

20. The network traffic management system of claim 16, wherein the one or more processors are further configured to be capable of executing the stored programmed instructions to output the stored duration or another stored duration corresponding to one or more other states, when a determination indicates that a reset packet has been received or an acknowledgement packet has been received in response to a finish packet.

* * * * *